(12) United States Patent
Yuminamochi et al.

(10) Patent No.: US 12,413,838 B2
(45) Date of Patent: Sep. 9, 2025

(54) INSPECTION APPARATUS AND INSPECTION SYSTEM

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Mitsunori Yuminamochi, Chigasaki Kanagawa (JP); Akihiro Matsuzaki, Chigasaki Kanagawa (JP); Masaoki Saito, Yokohama Kanagawa (JP); Hitoshi Katayama, Yokohama Kanagawa (JP); Fumio Sato, Yokohama Kanagawa (JP); Dai Nozaki, Kawasaki Kanagawa (JP)

(73) Assignees: KABUSHIKI KAISHA TOSHIBA, Tokyo (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 108 days.

(21) Appl. No.: 18/357,513

(22) Filed: Jul. 24, 2023

(65) Prior Publication Data
US 2024/0114225 A1    Apr. 4, 2024

(30) Foreign Application Priority Data

Sep. 30, 2022  (JP) ................................ 2022-158625
Sep. 30, 2022  (JP) ................................ 2022-158633

(51) Int. Cl.
*H04N 23/55*    (2023.01)
*H04N 23/50*    (2023.01)
(Continued)

(52) U.S. Cl.
CPC .......... *H04N 23/555* (2023.01); *H04N 23/66* (2023.01); *H04N 23/695* (2023.01)

(58) Field of Classification Search
CPC ..... H04N 23/555; H04N 23/66; H04N 23/695
See application file for complete search history.

(56) References Cited

U.S. PATENT DOCUMENTS 5,650,579 A * 7/1997 Hatley ................. B62D 55/065
                                          348/E7.086
6,100,711 A * 8/2000 Hatley .................. H02K 15/00
                                          324/545

(Continued)

FOREIGN PATENT DOCUMENTS

| JP | 6425844    | B2 | 11/2018 |
| JP | 2019-117137 | A  | 7/2019  |
| JP | 2019-117138 | A  | 7/2019  |

*Primary Examiner* — Timothy R Newlin
(74) *Attorney, Agent, or Firm* — Foley & Lardner LLP

(57) ABSTRACT

An inspection apparatus of an embodiment includes a rotor image-pickup unit for picking up an image of a rotor using a rotor image-pickup device in the air gap between the rotor and a stator. The rotor image-pickup device includes: a carriage casing; a camera; an image-pickup position changing part; and an image-pickup direction changing part. The camera is installed in the carriage casing, and picks up an image of a ventilation hole of the rotor in the air gap. The image-pickup position changing part is installed in the carriage casing, and changes an image-pickup position of the camera by moving the carriage casing in a circumferential direction of the rotor in the air gap. The image-pickup direction changing part is installed in the carriage casing, and changes an image-pickup direction of the camera to an inclined angle to a radial direction of the rotor in the air gap.

8 Claims, 21 Drawing Sheets

(51) Int. Cl.
    *H04N 23/66*       (2023.01)
    *H04N 23/695*    (2023.01)

(56)              References Cited

U.S. PATENT DOCUMENTS

| | | | |
|---|---|---|---|
| 7,624,827 B2 * | 12/2009 | Moser | B62D 55/125 |
| | | | 305/132 |
| 2008/0087112 A1 * | 4/2008 | Bagley | G01N 29/265 |
| | | | 322/99 |
| 2009/0256584 A1 * | 10/2009 | Moser | G01R 31/34 |
| | | | 324/765.01 |
| 2015/0233787 A1 * | 8/2015 | Eakins | H02K 15/00 |
| | | | 901/44 |
| 2015/0276931 A1 * | 10/2015 | Airoldi | G01S 7/4808 |
| | | | 356/5.01 |
| 2017/0219533 A1 * | 8/2017 | Alford | G01N 29/262 |
| 2018/0059187 A1 * | 3/2018 | Choi | G08B 6/00 |
| 2018/0128879 A1 * | 5/2018 | Kuwahara | B25J 5/005 |
| 2018/0188187 A1 * | 7/2018 | Lakhani | H04N 23/56 |
| 2019/0126486 A1 * | 5/2019 | Hiraguri | G01B 5/14 |
| 2019/0130556 A1 * | 5/2019 | Kuwahara | G06T 7/90 |
| 2019/0195740 A1 | 6/2019 | Watanabe et al. | |
| 2019/0199179 A1 * | 6/2019 | Watanabe | B62D 55/075 |
| 2022/0224809 A1 * | 7/2022 | Borgmann | H04N 23/57 |
| 2022/0289323 A1 * | 9/2022 | Akin | B25J 5/005 |
| 2023/0406427 A1 * | 12/2023 | Goto | B62D 55/265 |
| 2024/0085480 A1 * | 3/2024 | Goto | G01N 29/225 |

\* cited by examiner

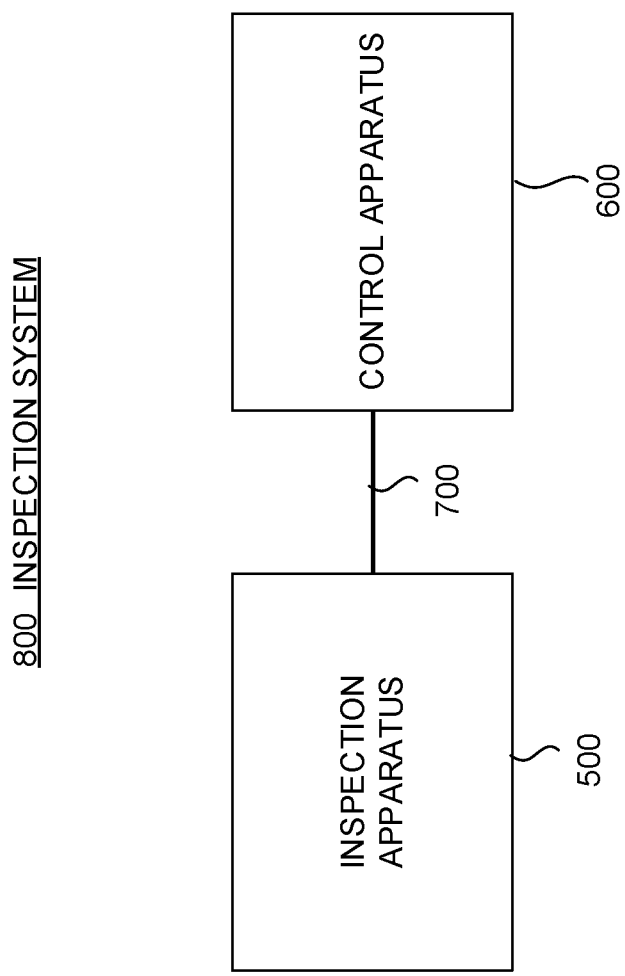

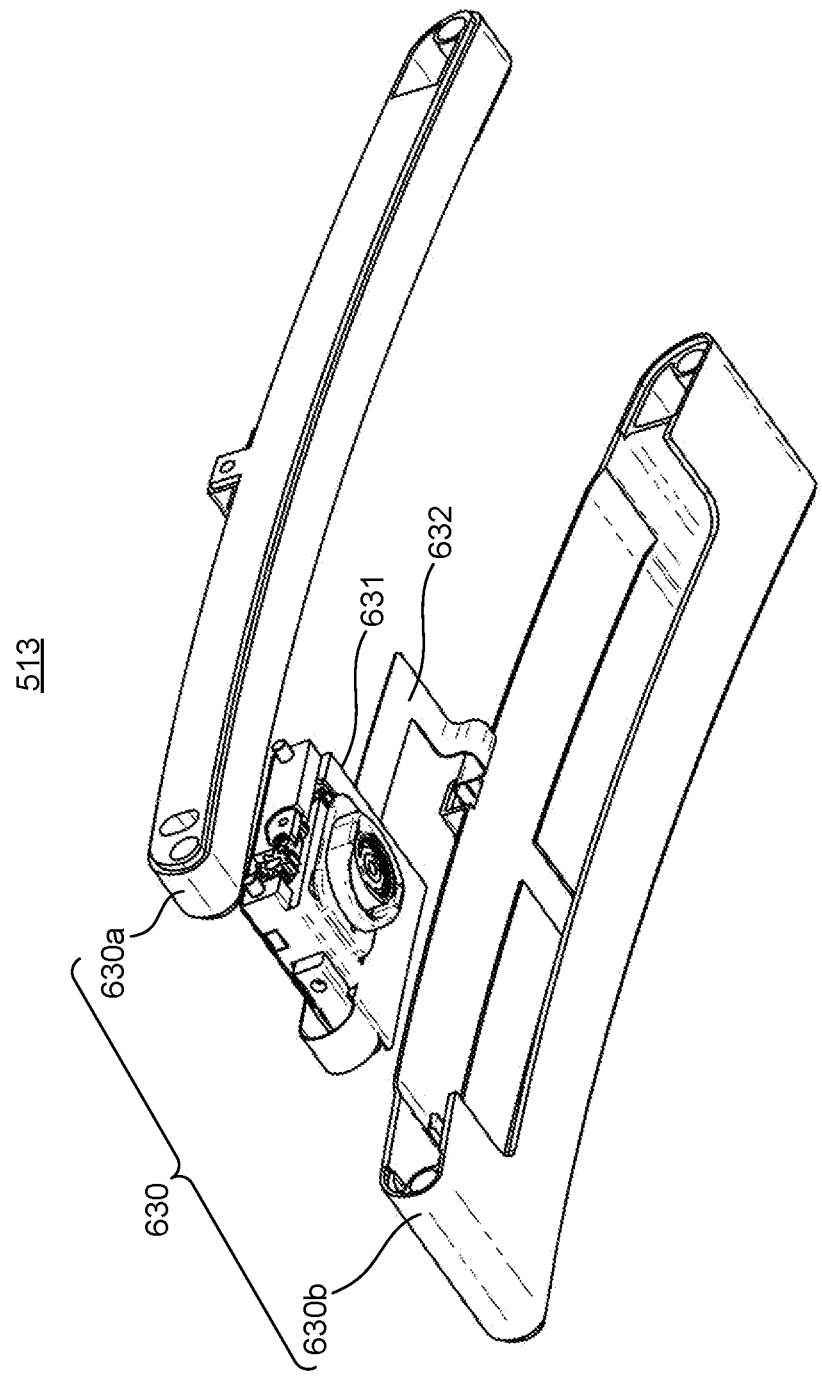

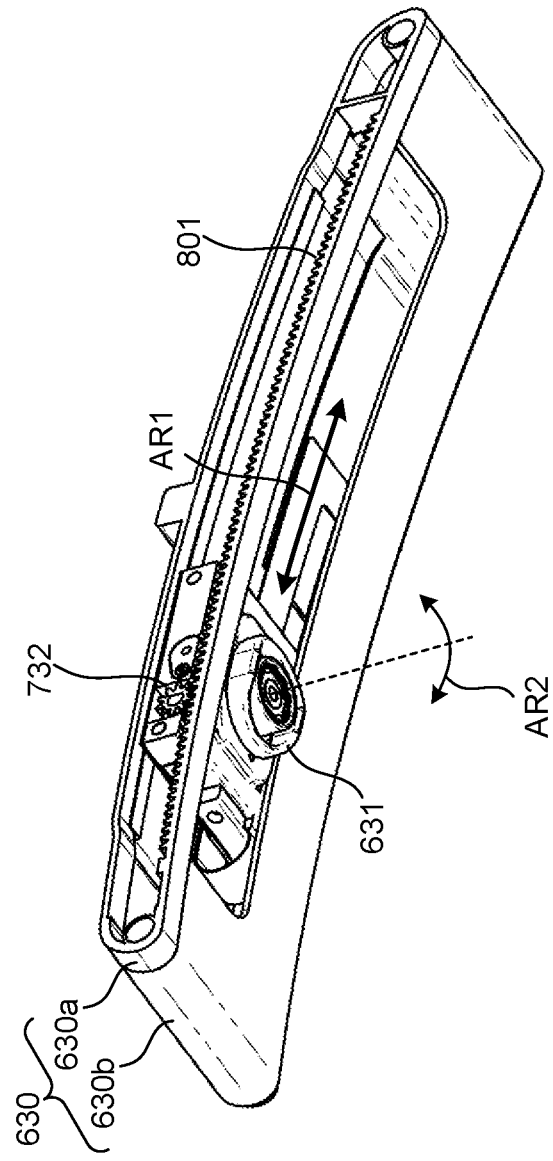

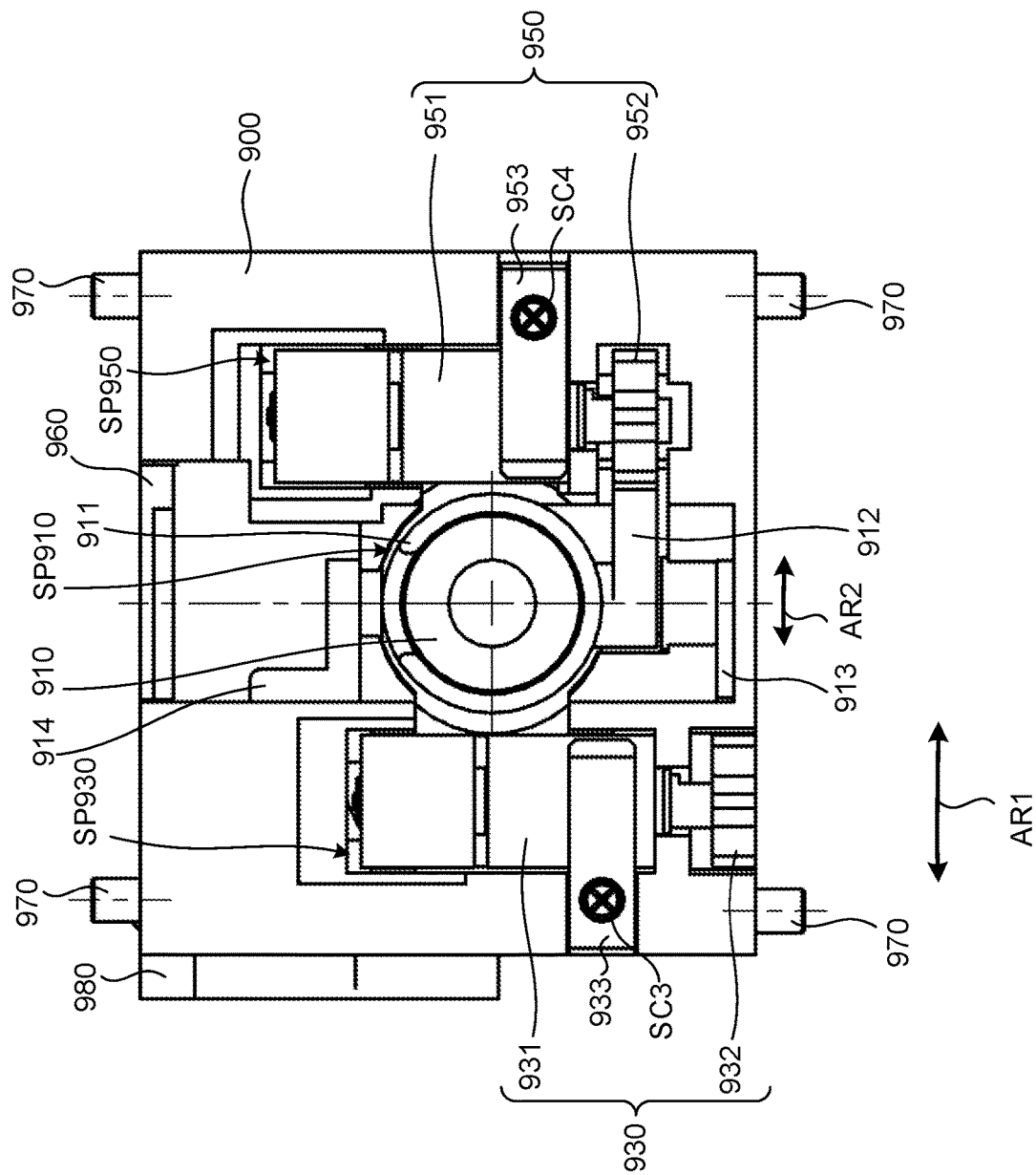

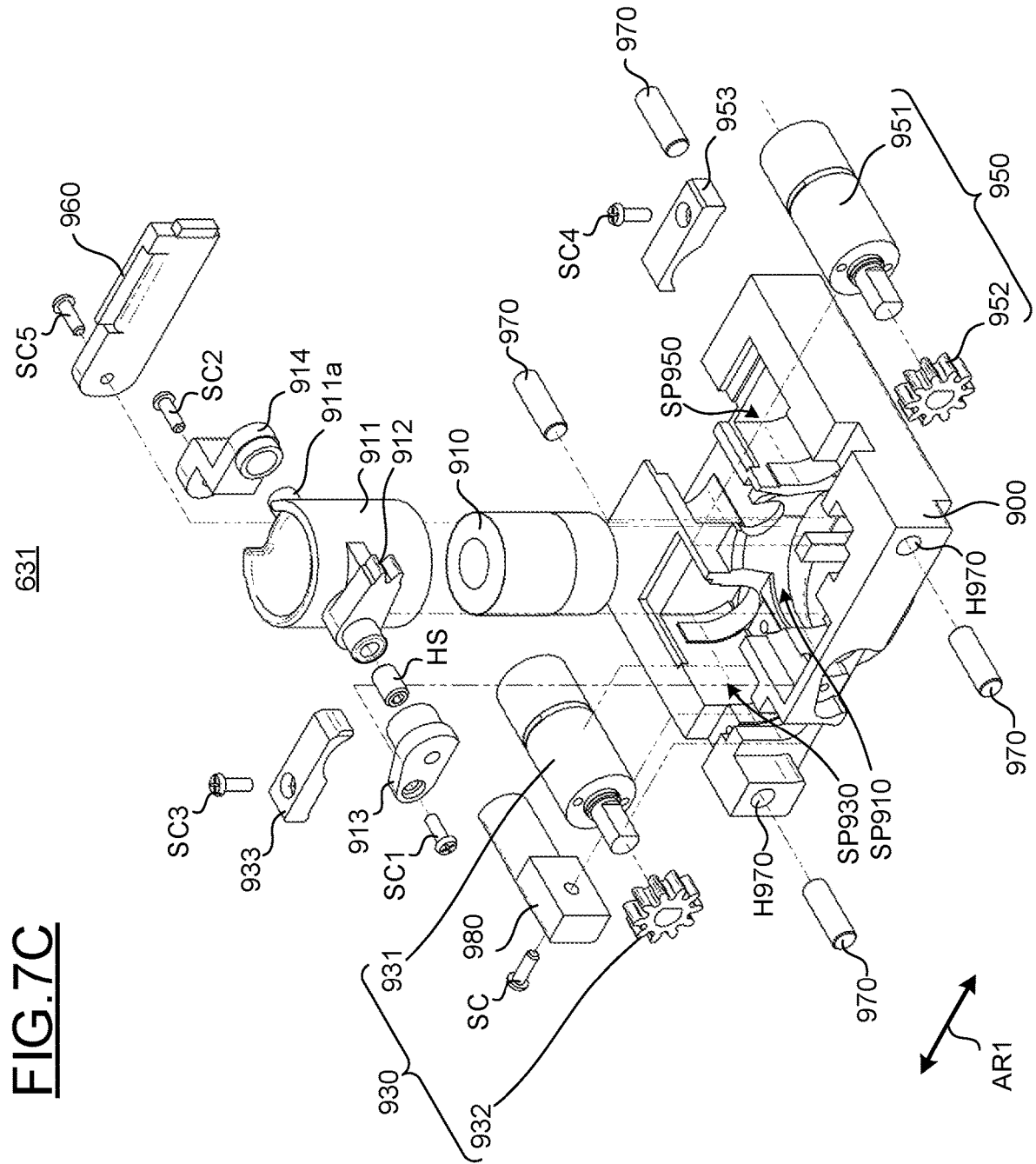

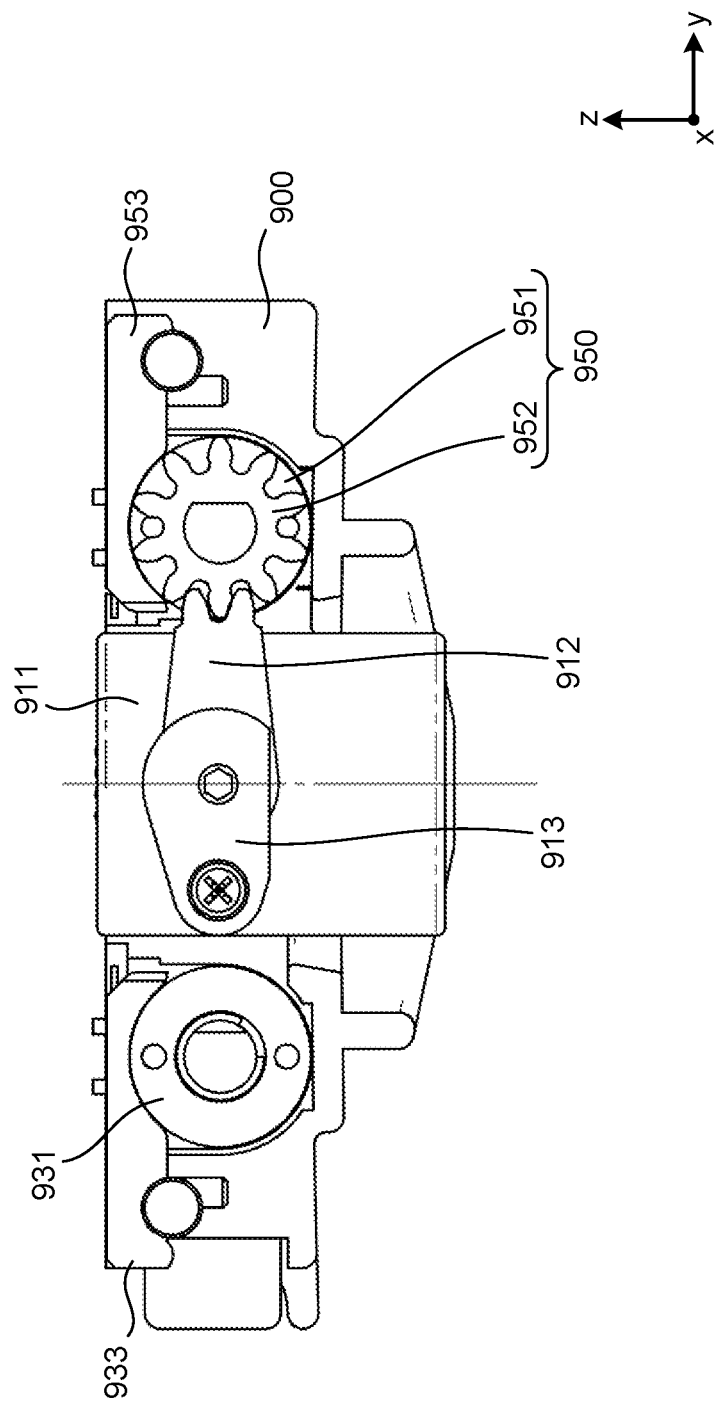

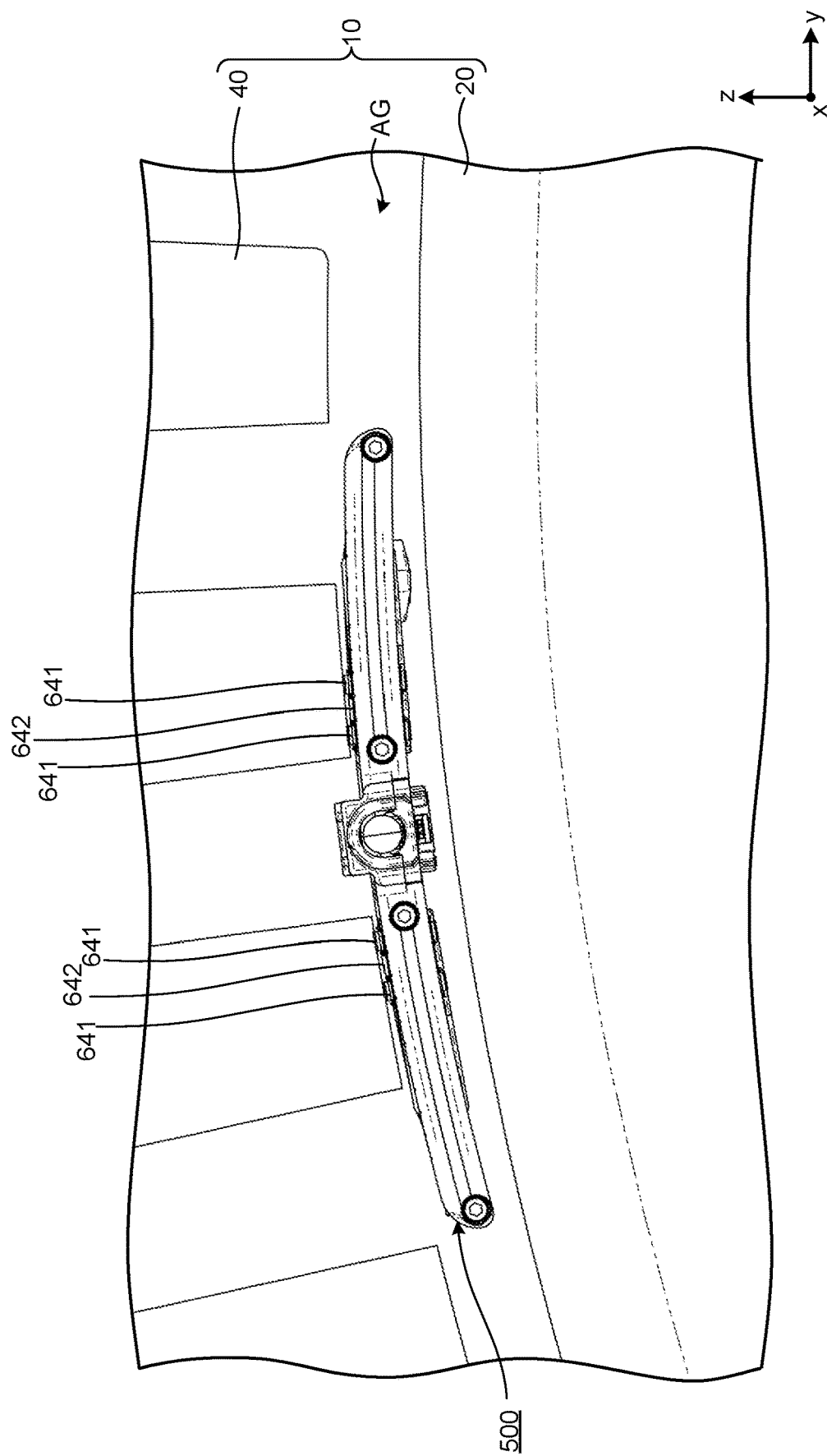

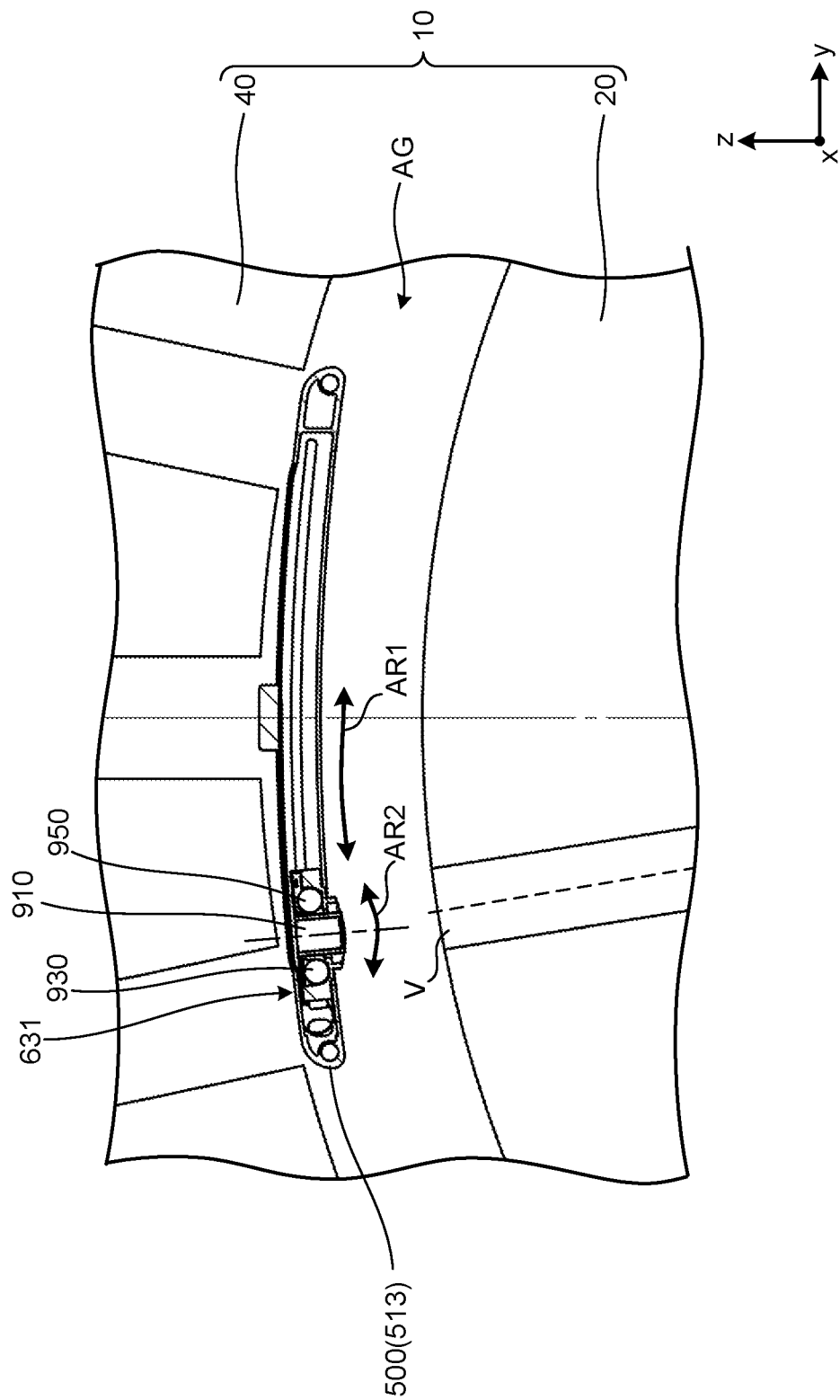

INSPECTION APPARATUS AND INSPECTION SYSTEM

CROSS REFERENCE TO RELATED APPLICATIONS

This application is based upon and claims the benefit of priority from Japanese Patent Application No. 2022-158625, filed on Sep. 30, 2022, and Japanese Patent Application No. 2022-158633, filed on Sep. 30, 2022; the entire contents of which are incorporated herein by reference.

FIELD

Embodiments relate to an inspection apparatus and an inspection system.

BACKGROUND

In rotary electric machines such as a generator and an electric motor, a cylindrical gap is interposed between a stator and a rotor.

On the rotary electric machine, an inspection for electrical and mechanical soundness is performed by maintenance work. The inspection on the rotary electric machine is performed by pulling the rotor out of the stator, for example. In addition to this, the inspection on the rotary electric machine is performed by inserting an inspection apparatus into a gap between the stator and the rotor and moving it in the gap, for example.

However, in the conventional inspection apparatus, the inspection is difficult to perform efficiently in some cases because the inspection apparatus is not easy to insert into the gap between the stator and the rotor, or the like. In particular, when the inspection is performed on the rotary electric machine in which a ventilation hole for cooling is formed in the rotor, in a case of inserting the inspection apparatus into the gap and making the inspection apparatus adhere to the stator, the rotor is in a state of stopping in an arbitrary position, which does not facilitate sufficient observation to a deep portion of the ventilation hole. As a result, it may be difficult to determine whether or not the ventilation hole is closed.

Accordingly, a problem to be solved by the present invention is to provide an inspection apparatus and an inspection system which easily enable an efficient inspection.

BRIEF DESCRIPTION OF THE DRAWINGS

FIG. 2 is a block diagram schematically illustrating an inspection system 800 for inspecting the rotary electric machine 10 (refer to FIG. 1) in the embodiment.

FIG. 6B is a perspective view illustrating the inspection unit 513 in the inspection apparatus 500 of the embodiment (disassembled state).

FIG. 6C is a perspective view illustrating the inspection unit 513 in the inspection apparatus 500 of the embodiment (open state).

FIG. 7B is a top view illustrating the image-pickup device 631 in the inspection unit 513 of the embodiment.

FIG. 7C is an exploded perspective view illustrating a state of disassembling the image-pickup device 631 in the inspection unit 513 of the embodiment.

FIG. 9A is a side view illustrating an image-pickup direction changing part 950 of the image-pickup device 631 in the inspection unit 513 of the embodiment.

FIG. 10A is a view illustrating a state of the inspection apparatus 500 when the inspection is performed on the rotary electric machine 10 in the embodiment.

FIG. 10B is a view illustrating a state of the inspection apparatus 500 when the inspection is performed on a ventilation hole of a rotor 20 constituting the rotary electric machine 10 in the embodiment.

DETAILED DESCRIPTION

An inspection apparatus of an embodiment, when an inspection is performed on a rotary electric machine in which an air gap is interposed between a rotor and a stator, and a ventilation hole along a radial direction of the rotor is formed in the rotor, is inserted into the air gap, and adheres to the stator. The inspection apparatus of the embodiment includes a rotor image-pickup unit for picking up an image of the rotor using a rotor image-pickup device in the air gap. The rotor image-pickup device includes: a carriage casing; a camera; an image-pickup position changing part; and an image-pickup direction changing part. The camera is installed in the carriage casing, and picks up an image of the ventilation hole of the rotor in the air gap. The image-pickup position changing part is installed in the carriage casing, and configured to change an image-pickup position of the camera by moving the carriage casing in a circumferential direction of the rotor in the air gap. The image-pickup direction changing part is installed in the carriage casing, and configured to change an image-pickup direction of the camera to an inclined angle to the radial direction of the rotor in the air gap.

One example of a rotary electric machine 10 which is an inspection object will be described before describing an inspection apparatus and an inspection system of an embodiment.

[A] Rotary Electric Machine 10

Figure 1:
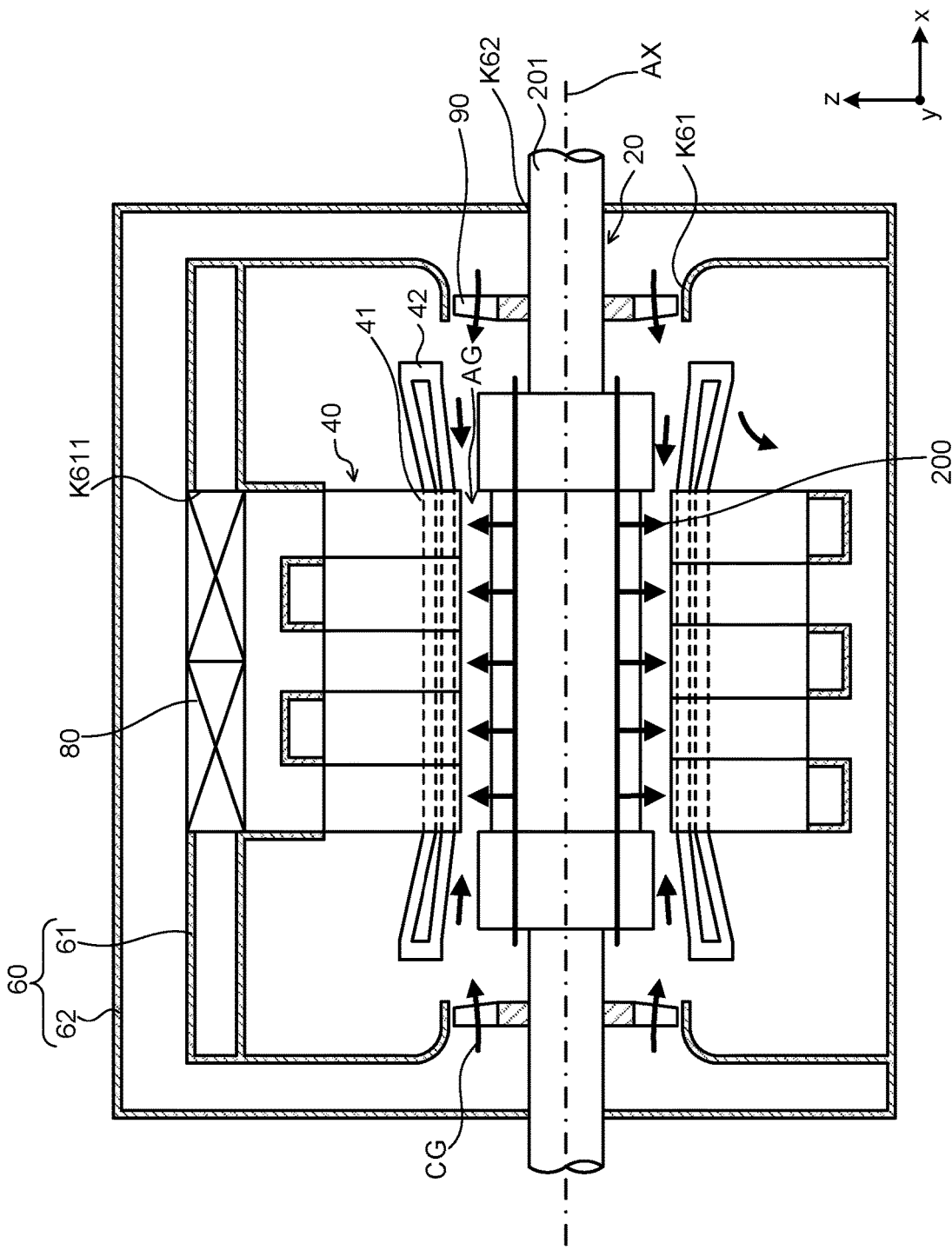
FIG. 1 is a view schematically illustrating one example of a rotary electric machine 10 which is an inspection object in an inspection apparatus of an embodiment.

FIG. 1 is a view schematically illustrating one example of the rotary electric machine 10 which is the inspection object in the inspection apparatus and the inspection system of the embodiment.

As illustrated in FIG. 1, the rotary electric machine 10, in which a rotor 20 and a stator 40 are housed in a rotary electric machine casing 60, is an inner rotor type of the rotor 20 rotating inside the stator 40. The rotary electric machine 10 is, for example, a generator, and is configured to generate electricity by rotation of the rotor 20. The rotary electric machine 10 can be used as an electric motor in addition to the generator.

In this embodiment, the rotary electric machine 10 is configured such that a cooling gas CG (a cooling medium such as hydrogen or air) flows inside the rotary electric machine casing 60, thereby cooling the rotor 20 and the stator 40.

The components of the rotary electric machine 10 will be described.

[A-1] Rotor 20

In the rotary electric machine 10, the rotor 20 is installed so that an axial direction along a rotation axis AX is along a horizontal direction x. Here, in the rotor 20, a rotor core 200 in a cylindrical shape is provided coaxially with a rotary shaft 201, and a cooling flow path through which the cooling gas CG flows is formed.

In the rotor core 200 of the rotor 20, a plurality of rotor slots (illustration is omitted) are formed in a circumferential direction of the rotor 20, and in the rotor slot, members of a rotor coil, a rotor wedge, and the like are installed. In the members installed in the rotor slot, a ventilation hole through which the cooling gas CG flows is formed along a radial direction of the rotor 20. A plurality of the ventilation holes through which the cooling gas CG flows are formed at intervals in the circumferential direction of the rotor 20, and the plurality of ventilation holes are formed at intervals in the axial direction of the rotor 20.

[A-2] Stator 40

In the stator 40, a stator coil 42 is installed in a stator core 41. The stator core 41 is in a cylindrical shape, and is provided coaxially with the rotary shaft 201. The stator core 41 is installed to surround the rotor core 200 with an air gap AG in a cylindrical shape therebetween.

On an inner peripheral side of the stator core 41, stator slots penetrating in the axial direction of the rotation axis AX are formed, and the stator coil 42 is inserted into the stator slot, and fixed with, for example, a stator wedge (illustration is omitted). Although illustration is omitted, a cooling flow path through which the cooling gas CG flows is also formed in the stator 40.

[A-3] Rotary Electric Machine Casing 60

In the rotary electric machine casing 60, which has a double structure, an outer casing 62 is provided outside an inner casing 61. The inner casing 61 has a through hole K61 penetrated by the rotary shaft 201, and houses the rotor 20 and the stator 40 in the interior thereof. The outer casing 62 has a through hole K62 penetrated by the rotary shaft 201, and houses the inner casing 61 in the interior thereof.

In the rotary electric machine casing 60, an opening K611 is provided on an upper side of the inner casing 61, and a gas cooler 80 is attached to the opening K611. Further, a fan 90 is housed inside the through hole K61 of the inner casing 61.

The fan 90 is an axial fan, and is fixed to each of one side portion and the other side portion of the rotary shaft 201 so as to sandwich the rotor 20.

[A-4] Flow of the Cooling Gas CG in the Rotary Electric Machine 10

In the rotary electric machine 10, by rotation of the fan 90 with the rotary shaft 201, the cooling gas CG flows from the exterior of the inner casing 61 into the interior thereof. Here, the cooling gas CG flows to go from each of one side portion and the other side portion of the rotary shaft 201 toward the middle portion thereof.

Inside the inner casing 61, the cooling gas CG flows into the cooling flow path formed inside the rotor 20, thereafter flowing out to the air gap AG located between an outer peripheral surface of the rotor 20 and an inner peripheral surface of the stator 40. In the rotor 20, the cooling gas CG flows along the axial direction, thereafter flowing from its inner peripheral side to its outer peripheral side through the ventilation holes formed along the radial direction.

Although illustration is omitted, the cooling gas CG thereafter flows via the air gap AG through the cooling flow path formed inside the stator 40. The cooling gas CG discharged to the exterior of the stator 40 flows from the interior of the inner casing 61 to the exterior thereof via the gas cooler 80. At this time, the cooling gas CG is cooled in the gas cooler 80. The cooling gas CG cooled in the gas cooler 80 flows through a space located outside the inner casing 61 in the outer casing 62, thereafter, as described above, flowing from the exterior of the inner casing 61 into the interior thereof by the rotation of the fan 90.

Thus, the rotary electric machine 10 is configured to cool the respective components by the cooling gas CG flowing in circulation inside the rotary electric machine casing 60.

[B] Inspection System 800

An inspection system 800 used when the above-described rotary electric machine 10 (refer to FIG. 1) is inspected will be described.

FIG. 2 is a block diagram schematically illustrating the inspection system 800 for inspecting the rotary electric machine 10 (refer to FIG. 1) in the embodiment.

As illustrated in FIG. 2, the inspection system 800 of the embodiment includes an inspection apparatus 500 and a control apparatus 600, and is configured to be capable of communicating between the inspection apparatus 500 and the control apparatus 600 via a cable 700.

[B-1] Inspection Apparatus 500

Although details are described later, the inspection apparatus 500 is a self-propelled inspection robot, and is configured to, when the inspection on the rotary electric machine 10 (refer to FIG. 1) is performed, be inserted into the air gap AG interposed between the rotor 20 and the stator 40 and be capable of traveling in a state of adhering to the stator 40.

[B-2] Control Apparatus 600

The control apparatus 600 is provided for remotely controlling the operation of the inspection apparatus 500. The control apparatus 600 includes an arithmetic unit (computer) and a storage device, and is configured such that the arithmetic unit executes the control of the operation of the inspection apparatus 500 using programs stored by the storage device.

Here, the control apparatus 600 performs the control so that the inspection apparatus 500 performs the inspection on the rotary electric machine 10 in response to an operation command input with operating devices (mouse, keyboard, and the like) by an operator, for example. Further, the control apparatus 600 performs the control so as to display information on the inspection to be performed by the inspection apparatus 500, information obtained by performing the inspection with the inspection apparatus 500, and the like on, for example, a display.

[C] Configuration of the Inspection Apparatus 500

A configuration of the inspection apparatus 500 constituting the above-described inspection system 800 (refer to FIG. 2) will be described.

Figure 3A:
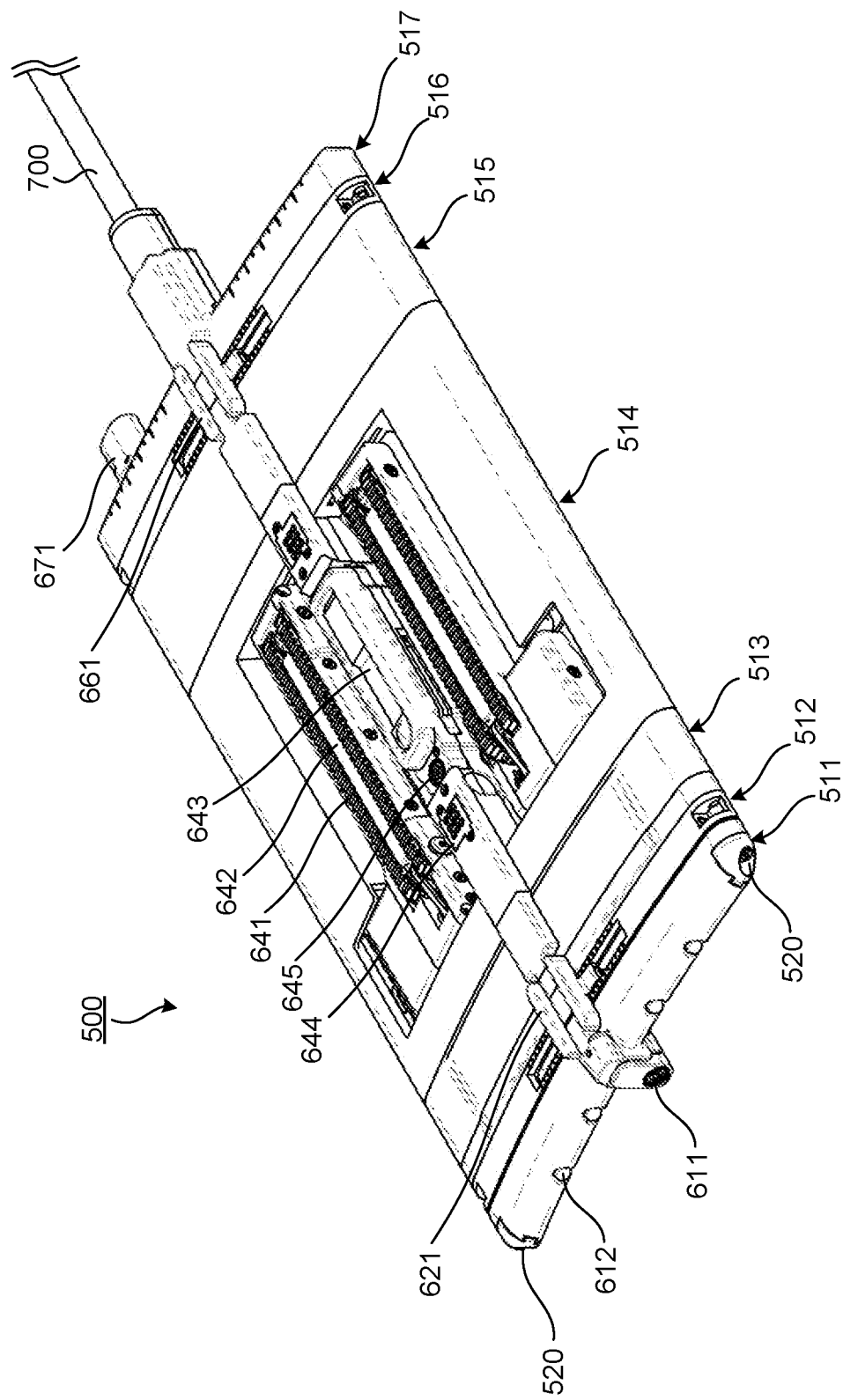
FIG. 3A is a perspective view illustrating an inspection apparatus 500 in the embodiment.
Figure 3B:
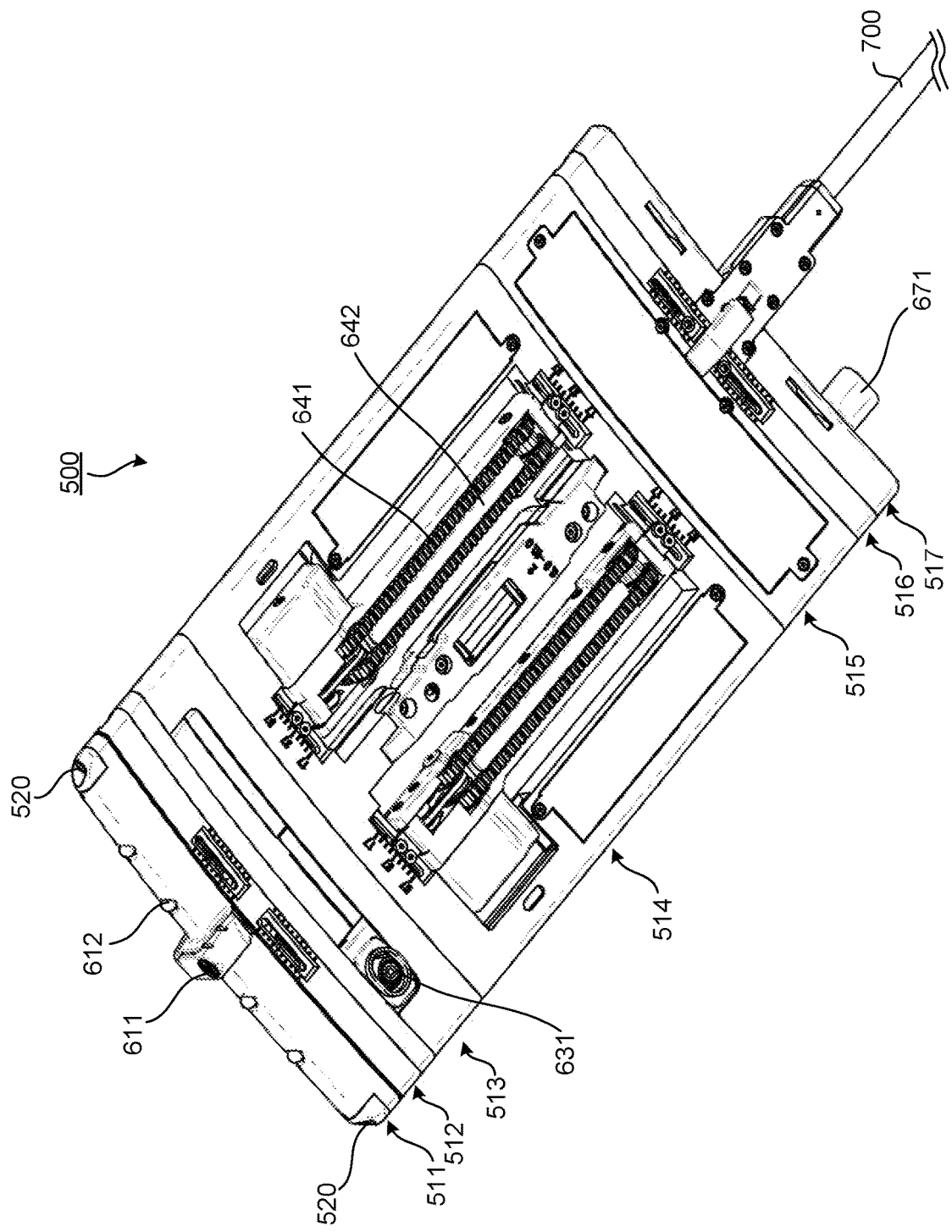
FIG. 3B is a perspective view illustrating the inspection apparatus 500 in the embodiment.

FIG. 3A and FIG. 3B are each a perspective view illustrating the inspection apparatus 500 in the embodiment.

When the inspection apparatus 500 is inserted into the air gap AG between the rotor 20 and the stator 40, FIG. 3A illustrates its surface side located on the stator 40 side. When the inspection apparatus 500 is inserted into the air gap AG between the rotor 20 and the stator 40, FIG. 3B illustrates its surface side located on the rotor 20 side.

As illustrated in FIG. 3A and FIG. 3B, the inspection apparatus 500 includes a plurality of inspection units 511 to 517 and a coupling shaft 520.

[C-1] a Plurality of Inspection Units 511 to 517

A plurality of the respective inspection units 511 to 517 are provided for performing the inspection in the air gap AG between the rotor 20 and the stator 40 constituting the rotary electric machine 10 (refer to FIG. 1). A plurality of the respective inspection units 511 to 517 are configured to be in a state of being coupled in an axial direction along the rotation axis AX of the rotor 20 when inserted into the air gap AG between the rotor 20 and the stator 40.

A plurality of the respective inspection units 511 to 517 have functions for performing the inspection on the rotary electric machine 10 (refer to FIG. 1).

Concretely, the inspection unit 511 is a tip-side image-pickup unit, includes an image-pickup device 611 and a lighting device 612 as inspection devices, and is configured such that the lighting device 612 lights a tip side of the inspection apparatus 500 and the image-pickup device 611 picks up its image (refer to FIG. 3A).

The inspection unit 512 is a guide unit, includes a pair of guide plates 621 as an inspection device, and is configured to guide a moving direction of the inspection apparatus 500. Here, a pair of the guide plates 621 is inserted into a groove (illustration is omitted) formed along the axial direction in the stator 40 (refer to FIG. 1), and guides the inspection apparatus 500 in moving along the axial direction, for example. Further, the inspection unit 512 is configured to vary a distance between a pair of the guide plates 621 according to a width of the groove formed in the stator 40 (refer to FIG. 3A).

The inspection unit 513 is a rotor image-pickup unit, includes an image-pickup device 631 (rotor image-pickup device) as an inspection device, and is configured to pick up an image of the rotor 20 (refer to FIG. 1) with the image-pickup device 631 (refer to FIG. 3B).

The inspection unit 514 is a traveling unit, and includes a moving mechanism including a crawler 641 (endless belt) and a permanent magnet 642 as an inspection device. The inspection unit 514 is configured such that the inspection apparatus 500 moves with the crawler 641 in a state in which the inspection apparatus 500 adheres to the stator 40 (refer to FIG. 1) by magnetic force of the permanent magnet 642. Here, the inspection unit 514 includes the two moving mechanisms in each of which the one permanent magnet 642 is sandwiched by a pair of the crawlers 641, and the operation of the two moving mechanisms allows the inspection apparatus 500 to be moved to any position. Further, the inspection unit 514 includes a hammer 643 and a microphone 644 as inspection devices, and is configured to detect sound when the stator 40 is struck with the hammer 643 by using the microphone 644. In addition to this, the inspection unit 514 includes an image-pickup device 645 as an inspection device, and is configured to pick up an image of the stator 40 with the image-pickup device 645 (refer to FIG. 3A).

The inspection unit 515 is a control unit, and is configured to include a control board (illustration is omitted) for controlling the operation of the units constituting the inspection apparatus 500 as an inspection device.

The inspection unit 516 is a guide unit, includes a pair of guide plates 661 as an inspection device, and is configured to guide the moving direction of the inspection apparatus 500, similarly to the inspection unit 512 (refer to FIG. 3A).

The inspection unit 517 is an interface to which the cable 700 for connecting the inspection apparatus 500 and the control apparatus 600 (refer to FIG. 2) therebetween is coupled. Further, the inspection unit 517 includes an image-pickup device 671 as an inspection device, and is configured such that the image-pickup device 671 picks up an image on a rear end side of the inspection apparatus 500 (refer to FIG. 3A).

Figure 3C:
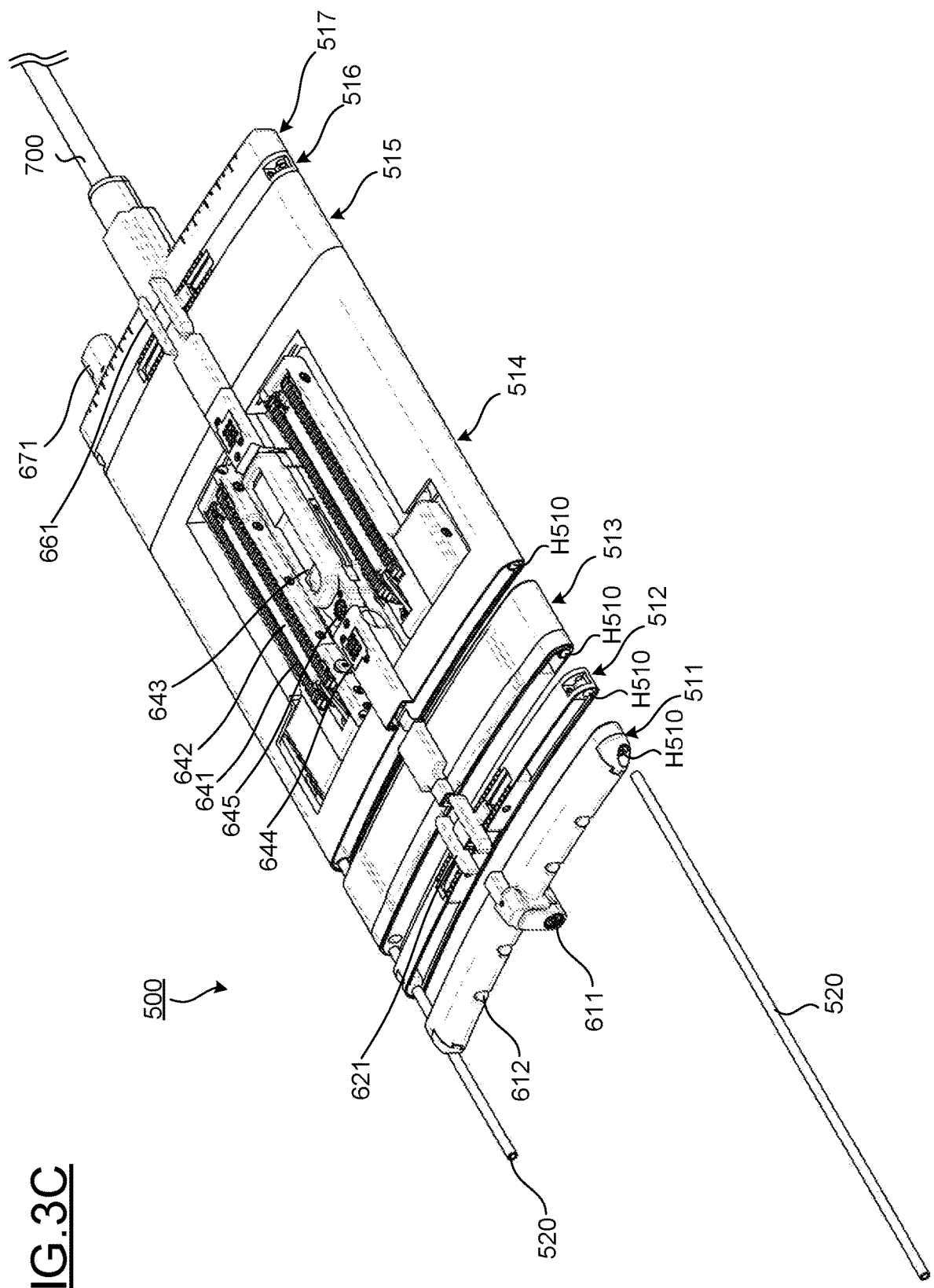
FIG. 3C is a perspective view illustrating a state of disassembling a part of the inspection apparatus 500 of the embodiment.

FIG. 3C is a perspective view illustrating a state of disassembling a part of the inspection apparatus 500 of the embodiment.

As illustrated in FIG. 3C, through each of the inspection units 511 to 514, a coupling hole H510 is formed. Although illustration is omitted, the coupling hole H510 is also formed through each of the other inspection units 515 to 517. In the plurality of inspection units 511 to 517, the coupling holes H510 are configured to be communicated with one another when the plurality of inspection units 511 to 517 are in a coupled state.

In this embodiment, the two coupling holes H510 are formed through each of the plurality of inspection units 511 to 517. The two coupling holes H510 are provided at both ends of each of the plurality of inspection units 511 to 517.

Note that although illustration is omitted, the plurality of inspection units 511 to 517 each have a connector (plug, jack, and the like) capable of electrically connecting one another, and are configured to be capable of communicating with the control apparatus 600.

[C-2] Coupling Shaft 520

The coupling shaft 520 is a rod-shaped body, and is provided for coupling the plurality of inspection units 511 to 517 therebetween, as illustrated in FIG. 3C.

Here, the coupling shaft 520 is detachable with respect to the plurality of inspection units 511 to 517. The coupling shafts 520 are inserted into the coupling holes H510 communicated with one another in the plurality of inspection units 511 to 517 when the plurality of inspection units 511 to 517 falls into the coupled state. In contrast with this, when the coupled state of the plurality of inspection units 511 to 517 is released, the coupling shafts 520 are taken out of the coupling holes H510.

[C-3] Details of Coupling Portions of the Plurality of Inspection Units 511 to 517

Details of portions where the plurality of inspection units 511 to 517 are coupled to one another will be described.

Figure 4A:
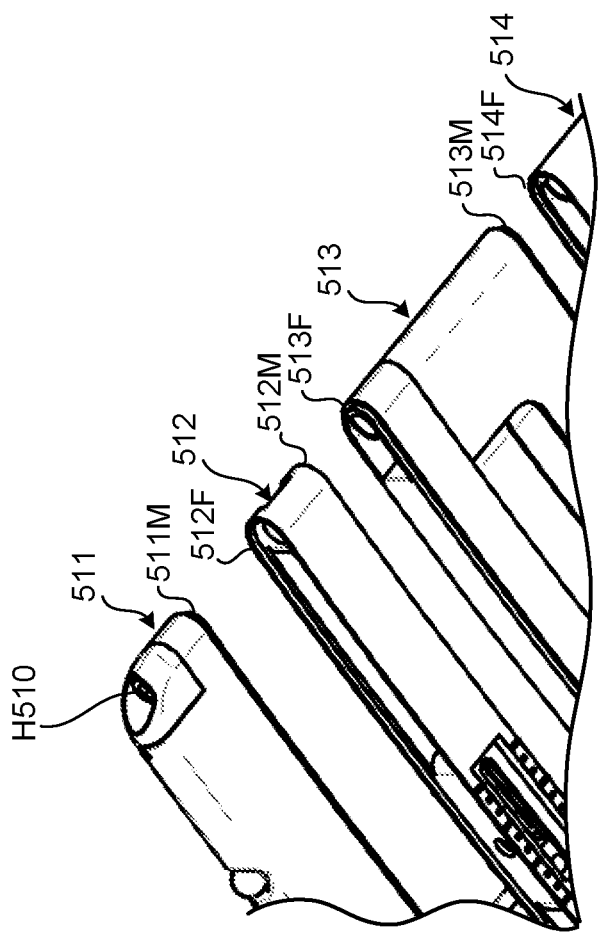
FIG. 4A is a view for explaining portions where a plurality of inspection units 511 to 517 are coupled to one another in the inspection apparatus 500 of the embodiment.
Figure 4B:
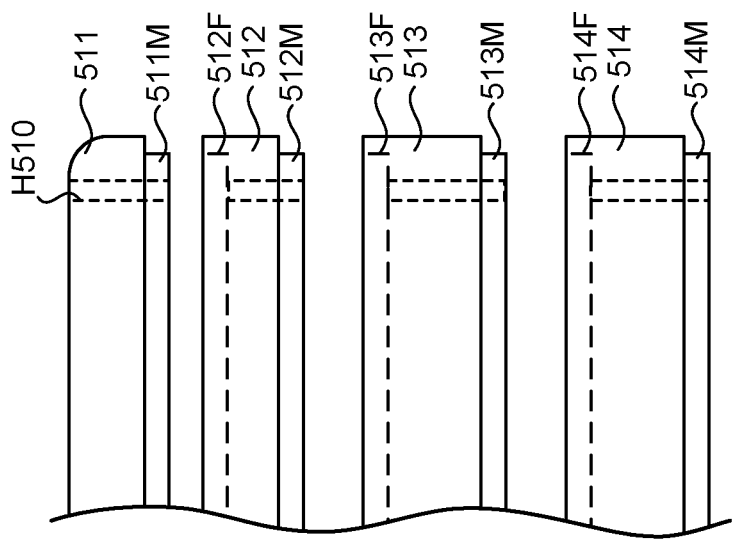
FIG. 4B is a view for explaining the portions where the plurality of inspection units 511 to 517 are coupled to one another in the inspection apparatus 500 of the embodiment.

FIG. 4A and FIG. 4B are each a view for explaining the portions where the plurality of inspection units 511 to 517 are coupled to one another in the inspection apparatus 500 of the embodiment.

FIG. 4A is a perspective view of enlarging and illustrating the coupling portions of the inspection units 511 to 514 in the inspection apparatus 500. FIG. 4B is a plan view of enlarging and illustrating the coupling portions of the inspection units 511 to 514 in the inspection apparatus 500. Here, the coupling portions of the inspection units 511 to 514 are illustrated, and they are also the same with coupling portions of the other inspection units 515 to 517.

As illustrated in FIG. 4A and FIG. 4B, the inspection units 511 to 514 are configured to be coupled by being fitted into one another. Concretely, a male fitting portion 511M formed in the inspection unit 511 and a female fitting portion 512F formed in the inspection unit 512 are fitted into each other. Further, a male fitting portion 512M formed in the inspection unit 512 and a female fitting portion 513F formed in the inspection unit 513 are fitted into each other. Similarly, a male fitting portion 513M formed in the inspection unit 513 and a female fitting portion 514F formed in the inspection unit 514 are fitted into each other.

Although illustration is omitted, any of the male fitting portions 511M, 512M, 513M and any of the female fitting portions 512F, 513F, 514F are configured to be fitted into each other. Thus, the plurality of inspection units 511 to 517 are detachable between one another, which allows various coupled states in addition to the above-described coupled state.

Figure 5:
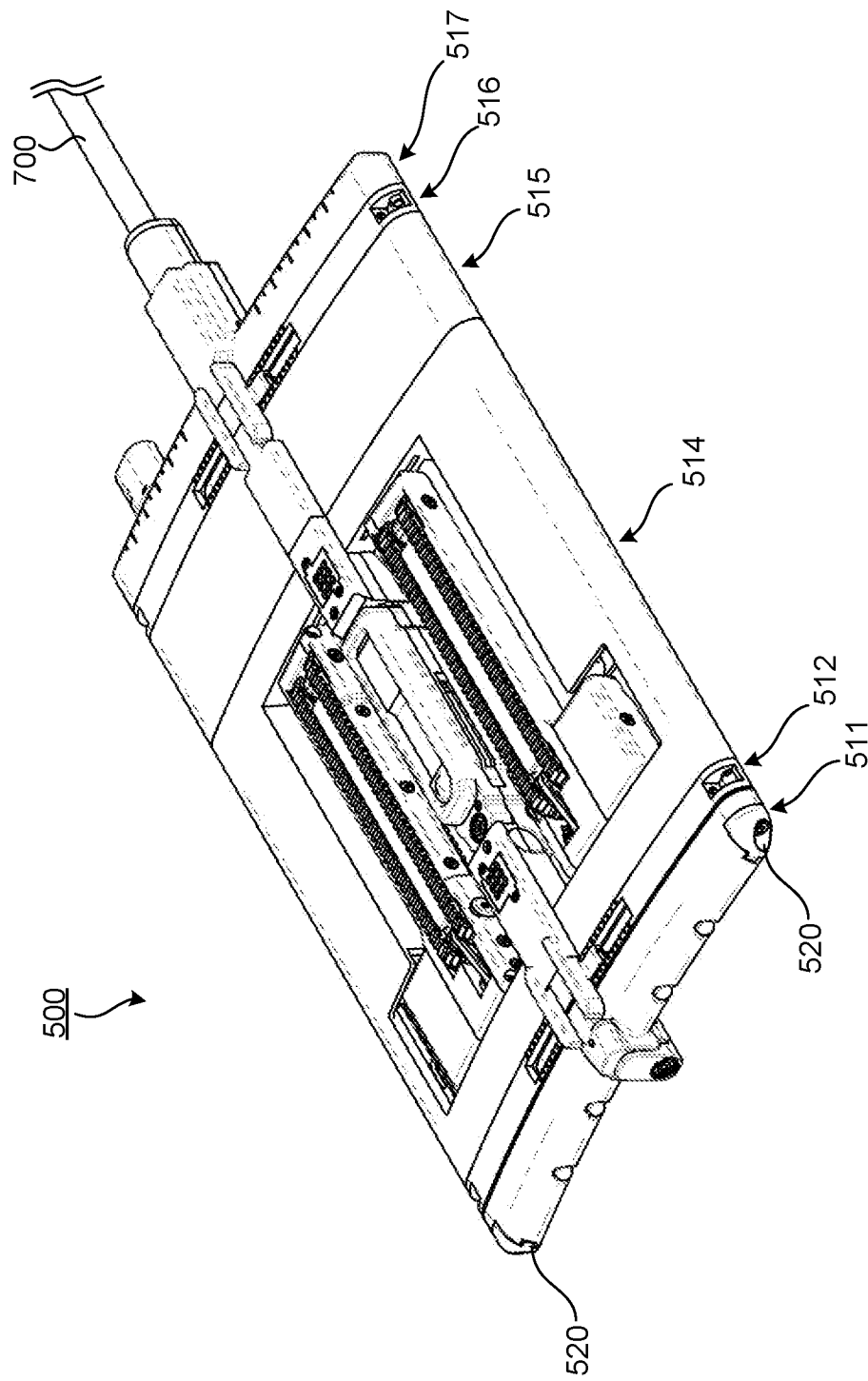
FIG. 5 is a perspective view illustrating the other example of a coupled state in which the plurality of inspection units 511 to 517 are coupled to one another in the inspection apparatus 500 of the embodiment.

FIG. 5 is a perspective view illustrating the other example of a coupled state in which the plurality of inspection units 511 to 517 are coupled to one another in the inspection apparatus 500 of the embodiment.

As illustrated in FIG. 5, in the inspection apparatus 500 of the embodiment, differently from the case in FIG. 3A, for example, the inspection unit 512 and the inspection unit 514 can be coupled to each other without interposing the inspection unit 513 therebetween. Thus, in this embodiment, the plurality of inspection units 511 to 517 have a structure common to their fitting portions, which allows any change in a length of the inspection apparatus 500.

Incidentally, in this case, the coupling shaft 520 having a length corresponding to the length of the inspection apparatus 500 is used.

[D] Detailed Configuration of the Inspection Unit 513 (Rotor Image-Pickup Unit)

Of the plurality of inspection units 511 to 517, the configuration of the inspection unit 513 which is the rotor image-pickup unit will be described.

Figure 6A:
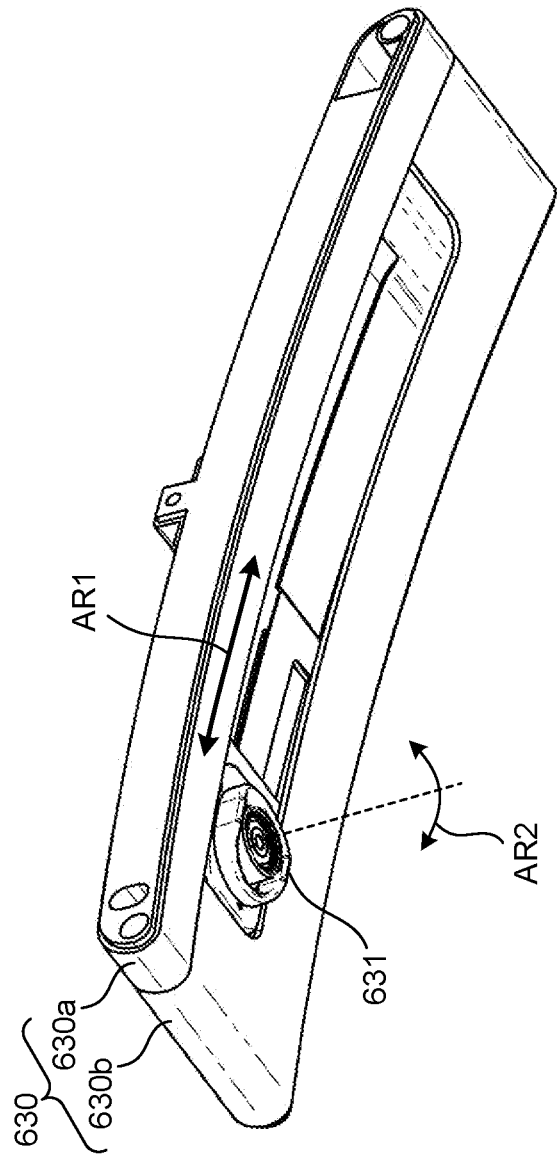
FIG. 6A is a perspective view illustrating the inspection unit 513 in the inspection apparatus 500 of the embodiment (assembled state).

FIG. 6A, FIG. 6B, and FIG. 6C are each a perspective view illustrating the inspection unit 513 (rotor image-pickup unit) in the inspection apparatus 500 of the embodiment.

FIG. 6A illustrates a state of assembling the inspection unit 513 (rotor image-pickup unit). FIG. 6B illustrates a state of disassembling a part of the inspection unit 513 (rotor image-pickup unit). Further, FIG. 6C illustrates a state of opening a part of the inspection unit 513 (rotor image-pickup unit) (here, a state of removing a part of a first frame member 630a) for explanation.

[D-1] Frame 630

As illustrated in FIG. 6A to FIG. 6C, the inspection unit 513 includes a frame 630 housing the image-pickup device 631 in addition to the image-pickup device 631 which is the rotor image-pickup device (refer to FIG. 3B).

In the inspection unit 513, as illustrated in FIG. 6A, the frame 630 is in an arc shape along the air gap AG in the cylindrical shape (refer to FIG. 1). In this embodiment, in the frame 630, at least a surface is formed using resin. For example, the whole of the frame 630 is formed using nylon 12. In addition to this, the frame 630 may be formed by covering a surface of a base material formed of a metallic material with the resin, for example. Similarly, the inspection units 511, 512, 514 to 517 in addition to the inspection unit 513 each also include an arc-shaped frame, and the frame is formed using the resin.

The frame 630 includes the first frame member 630a and a second frame member 630b, and the first frame member 630a and the second frame member 630b are, for example, fitted into each other, as illustrated in FIG. 6B. Note that similarly, the inspection units 511, 512, 514 to 517 in addition to the inspection unit 513 each also include the arc-shaped frame.

As illustrated in FIG. 6C, a rack gear 801 is formed in the inner portion of the first frame member 630a constituting the frame 630. The rack gear 801 is configured to arrange a plurality of gear teeth side by side along the arc shape of the frame 630.

[D-2] Image-Pickup Device 631

In the inspection unit 513, the image-pickup device 631 is configured to be capable of varying (refer to an arrow AR1) an image-pickup position, and be capable of varying (refer to an arrow AR2) an image-pickup direction by moving along the arc shape of the frame 630 inside the frame 630, as illustrated in FIG. 6A.

As illustrated in FIG. 6B, the image-pickup device 631 is electrically connected to a flexible cable 632 inside the frame 630. The image-pickup device 631 is electrically connected via the flexible cable 632 to the control apparatus 600 (refer to FIG. 2), and its operation is controlled.

Figure 7A:
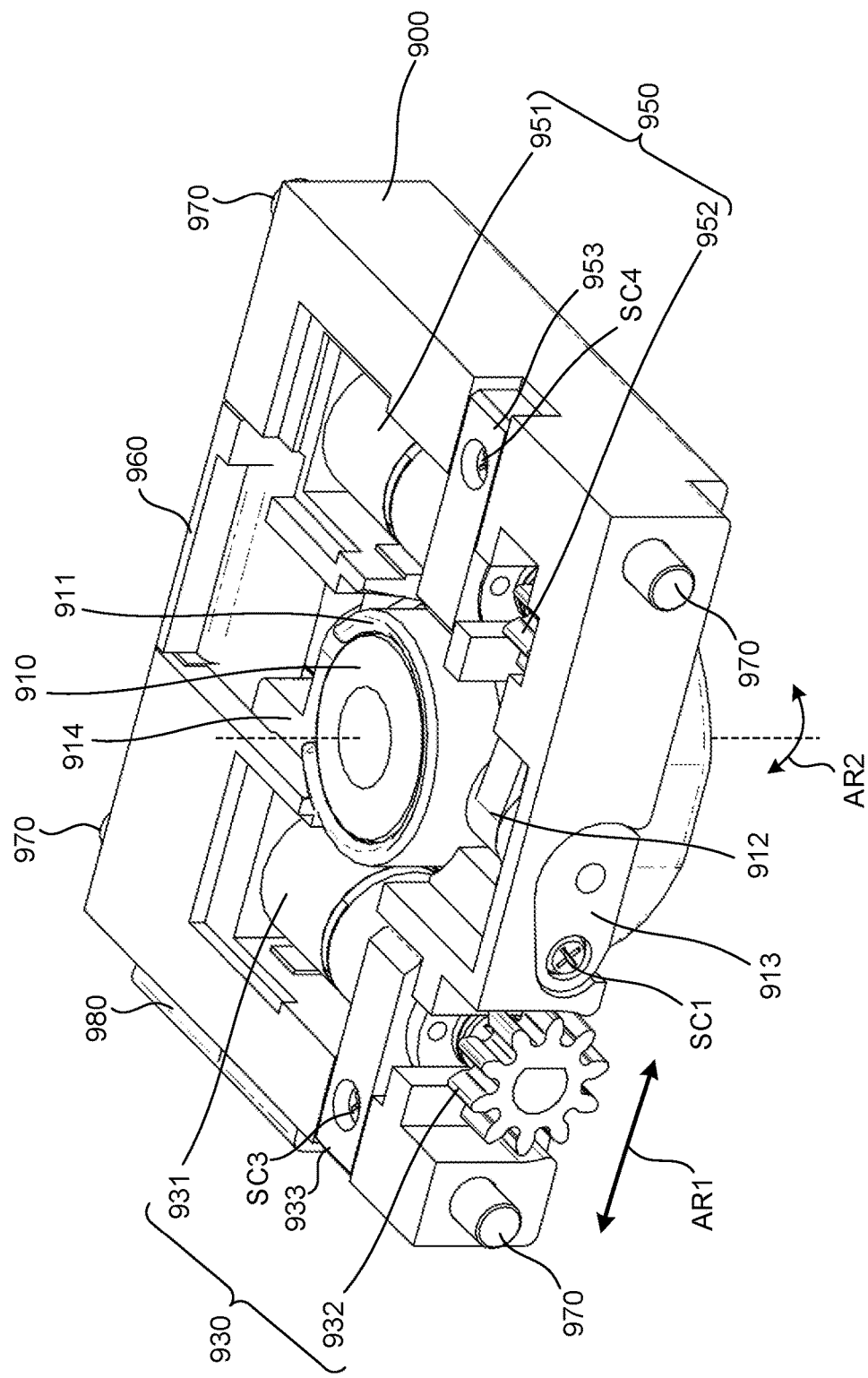
FIG. 7A is a perspective view illustrating an image-pickup device 631 in the inspection unit 513 of the embodiment.

FIG. 7A is a perspective view illustrating the image-pickup device 631 in the inspection unit 513 of the embodiment. FIG. 7B is a top view illustrating the image-pickup device 631 in the inspection unit 513 of the embodiment. FIG. 7C is an exploded perspective view illustrating a state of disassembling the image-pickup device 631 in the inspection unit 513 of the embodiment.

In the inspection unit 513, a camera 910, an image-pickup position changing part 930, and an image-pickup direction changing part 950 are installed in a carriage casing 900 in the image-pickup device 631 which is the rotor image-pickup device, as illustrated in FIG. 7A to FIG. 7C.

Components of the image-pickup device 631 will be described in order.

[D-2-1] Carriage Casing 900

In the image-pickup device 631, the carriage casing 900, whose outer shape is a rectangular parallelepiped shape, includes a housing space SP910 housing the camera 910, a housing space SP930 housing the image-pickup position changing part 930, and a housing space SP950 housing the image-pickup direction changing part 950. The carriage casing 900 is configured to sandwich the housing space SP910 between the housing space SP930 and the housing space SP950 (refer to FIG. 7B, FIG. 7C).

[D-2-2] Camera 910

In the image-pickup device 631, the camera 910, whose details are described later, is provided for picking up an image of the ventilation hole in the air gap AG between the rotor 20 and the stator 40 (refer to FIG. 1).

Here, the camera 910 is installed in the housing space SP910 of the carriage casing 900 in a state of being housed in a camera holder 911 (refer to FIG. 7A to FIG. 7C).

The camera holder 911 is in a cylindrical shape, and houses the camera 910 in the interior thereof. Further, on an outer peripheral surface of the camera holder 911, a spur gear 912 is provided. The spur gear 912 is provided so that a rotation axis of the spur gear 912 is along a normal direction of the camera holder 911 in the cylindrical shape. In addition to this, on the outer peripheral surface of the camera holder 911, a shaft pin 911a is provided. The shaft pin 911a is in a column shape, and is provided so that a center axis of the shaft pin 911a is aligned coaxially with the rotation axis of the spur gear 912 (refer to FIG. 7A to FIG. 7C).

Further, the camera holder 911 is installed in the carriage casing 900 so as to swing along a pivoting direction of the spur gear 912 using a bush 913 and a bush 914 (refer to an arrow AR2 in FIG. 7A).

The bush 913 is coupled to the spur gear 912 with a hexagon socket set screw HS therebetween. Further, the bush 913 is fixed to the carriage casing 900 using a screw SC1. The bush 914 is coupled to the shaft pin 911a. Further, the bush 914 is fixed in the carriage casing 900 using a screw SC2 (refer to FIG. 7C).

Figure 8:
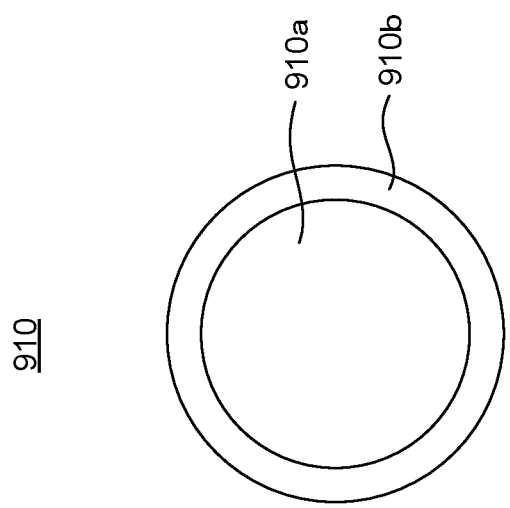
FIG. 8 is a bottom view of a camera 910 in the image-pickup device 631 of the embodiment.

FIG. 8 is a bottom view of the camera 910 in the image-pickup device 631 of the embodiment.

As illustrated in FIG. 8, the camera 910 is provided with a lighting section 910b so as to surround a peripheral surface of an image-pickup lens 910a in a disc shape. The lighting section 910b is constituted using, for example, a light-emitting diode (LED).

[D-2-3] Image-Pickup Position Changing Part 930

The image-pickup position changing part 930 is provided for changing an image-pickup position of the camera 910 by moving the carriage casing 900 in the circumferential direction of the rotor 20 (refer to the arrows AR1 in the figures) in the air gap AG between the rotor 20 and the stator 40 (refer to FIG. 1).

Here, the image-pickup position changing part 930 is installed in the housing space SP930 of the carriage casing 900, and includes an image-pickup position changing motor 931 and an image-pickup position changing pinion gear 932 (refer to FIG. 7A to FIG. 7C).

In the image-pickup position changing part 930, the image-pickup position changing motor 931 is fixed in the carriage casing 900 using a retaining plate 933 and a screw SC3. The image-pickup position changing pinion gear 932 is installed on a rotation shaft of the image-pickup position changing motor 931 (refer to FIG. 7A to FIG. 7C).

As illustrated in FIG. 6C, in the inspection unit 513, the image-pickup device 631 is installed so that the image-pickup position changing pinion gear 932 engages with the rack gear 801 formed in the frame 630. Thus, in this embodiment, a rotation of the image-pickup position changing pinion gear 932 moves the image-pickup device 631 along a drawing direction of the rack gear 801.

[D-2-4] Image-Pickup Direction Changing Part 950

The image-pickup direction changing part 950 is provided for changing an image-pickup direction of the camera 910 to an inclined angle to the radial direction of the rotor 20 (dotted lines in FIG. 6A, FIG. 6C, and FIG. 7A) in the air gap AG between the rotor 20 and the stator 40 (refer to FIG. 1) (refer to the arrows AR2 in FIG. 6A, FIG. 6C, and FIG. 7A).

Here, the image-pickup direction changing part 950 is installed in the housing space SP950 of the carriage casing 900, and includes an image-pickup direction changing motor 951 and an image-pickup direction changing pinion gear 952 (refer to FIG. 7A to FIG. 7C).

In the image-pickup direction changing part 950, the image-pickup direction changing motor 951 is fixed in the carriage casing 900 using a retaining plate 953 and a screw SC4. The image-pickup direction changing motor 951 is housed in the carriage casing 900 so that its rotation shaft is parallel to the rotation shaft of the image-pickup position changing motor 931. Further, the image-pickup direction changing pinion gear 952 is installed on the rotation shaft of the image-pickup direction changing motor 951 (refer to FIG. 7A to FIG. 7C).

Figure 9B:
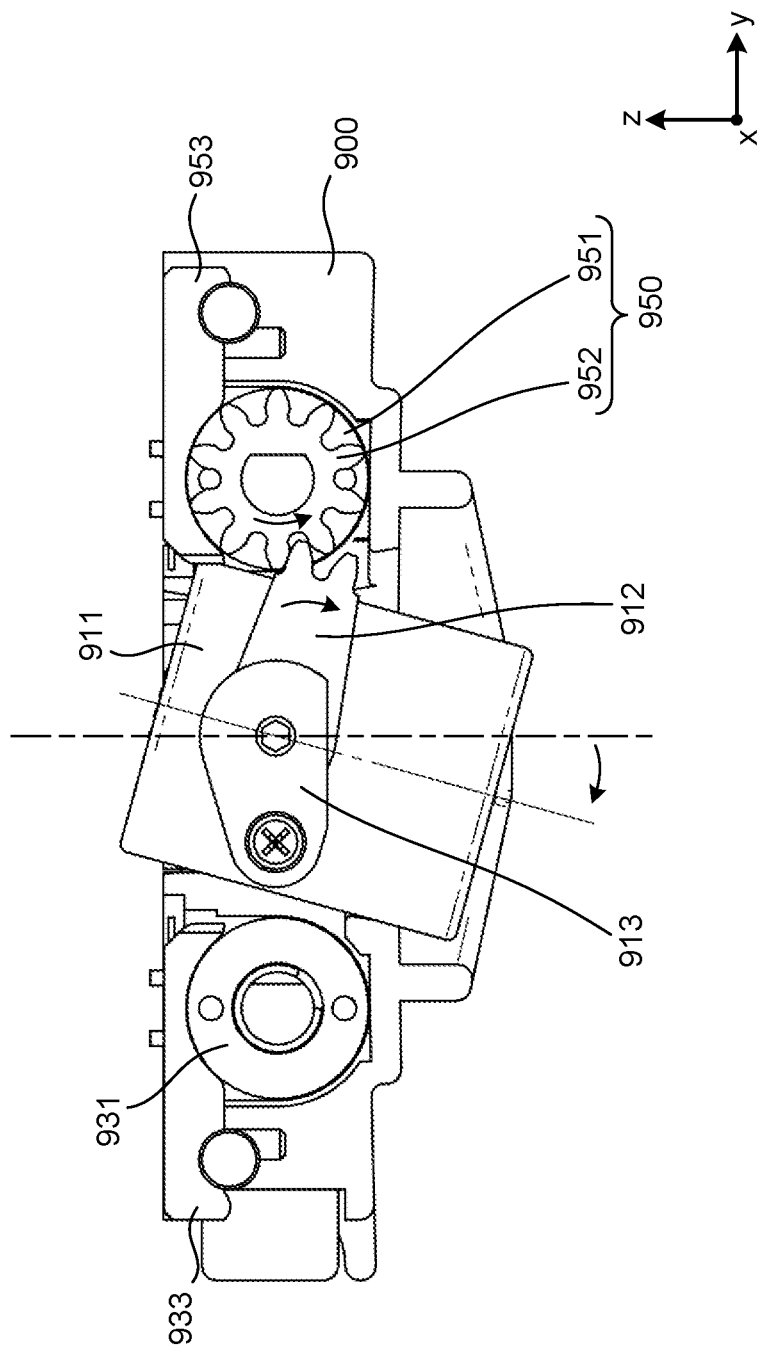
FIG. 9B is a side view illustrating the image-pickup direction changing part 950 of the image-pickup device 631 in the inspection unit 513 of the embodiment.
Figure 9C:
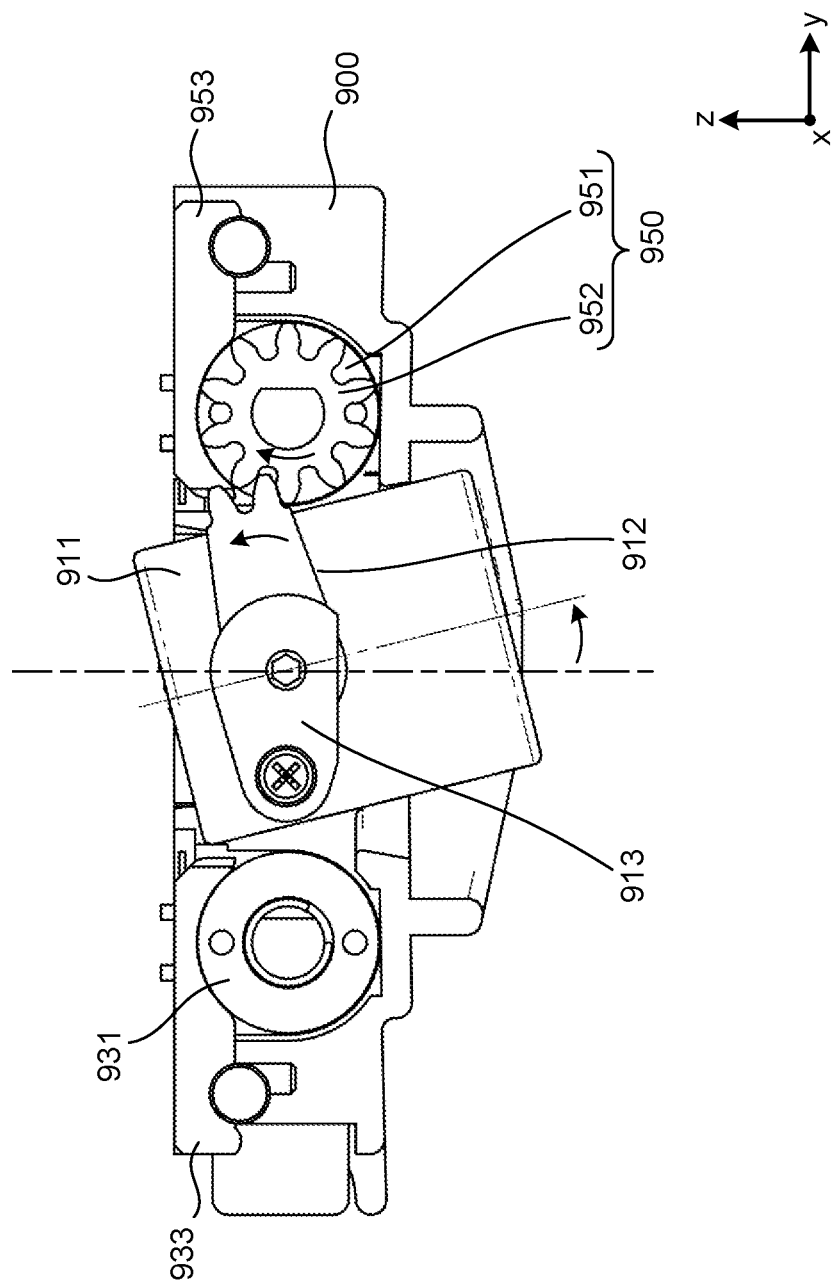
FIG. 9C is a side view illustrating the image-pickup direction changing part 950 of the image-pickup device 631 in the inspection unit 513 of the embodiment.

FIG. 9A to FIG. 9C are each a side view illustrating the image-pickup direction changing part 950 of the image-pickup device 631 in the inspection unit 513 of the embodiment.

FIG. 9A to FIG. 9C each illustrate a state of the image-pickup device 631 in a vertical plane (yz plane) orthogonal to the axial direction (x direction) when the inspection apparatus 500 is inserted into the air gap AG between the rotor 20 and the stator 40 (refer to FIG. 1) in the rotary electric machine 10 (refer to FIG. 1). FIG. 9A illustrates the state in which the image-pickup direction of the camera 910 is along the radial direction of the rotor 20. In contrast with this, FIG. 9B and FIG. 9C each illustrate the state in which the image-pickup direction of the camera 910 is along the radial direction of the rotor 20. In FIG. 9A to FIG. 9C, for convenience of explanation, illustration of members except for parts related to the image-pickup direction changing part 950 is appropriately omitted.

As illustrated in FIG. 9A to FIG. 9C, the image-pickup direction changing part 950 is installed in the carriage casing 900 so that the image-pickup direction changing pinion gear 952 engages with the spur gear 912 provided on the camera holder 911. Thus, in the image-pickup device 631 of this embodiment, a rotation of the image-pickup direction changing pinion gear 952 changes the image-pickup direction of the camera 910 housed in the camera holder 911 from the state of being along the radial direction of the rotor 20 to the state of being inclined thereto.

[D-2-5] Others

In addition to the above, the image-pickup device 631 includes a cable cover 960, pins 970, and a cable retaining plate 980 as illustrated in FIG. 7A to FIG. 7C.

The cable cover 960 is fixed in the carriage casing 900 using a screw SC5 (refer to FIG. 7C).

A plurality of the pins 970 are installed on the carriage casing 900 as illustrated in FIG. 7A to FIG. 7C. Here, in the carriage casing 900, on each of both side surfaces along the direction in which the image-pickup direction changing part 950 moves the carriage casing 900 (the arrow AR1), a pair of insertion holes H970 is formed at an interval, and the pins 970 are inserted into the respective insertion holes H970.

The cable retaining plate 980 is fixed to the carriage casing 900 using a screw SC6 (refer to FIG. 7C).

[E] Inspection Method

States when the inspection on the rotary electric machine 10 (refer to FIG. 1) is performed using the above-described inspection apparatus 500 (refer to FIG. 3A) will be described.

FIG. 10A is a view illustrating the state of the inspection apparatus 500 when the inspection is performed on the rotary electric machine 10 in the embodiment. FIG. 10A illustrates the vertical plane (yz plane) orthogonal to the axial direction (x direction) in the rotary electric machine 10 (refer to FIG. 1).

As illustrated in FIG. 10A, when the inspection on the rotary electric machine 10 is performed, the inspection apparatus 500 is inserted into the air gap AG interposed between the rotor 20 and stator 40. Here, the inspection apparatus 500 is inserted into the air gap AG of the rotary electric machine 10 so that a coupling direction of the plurality of inspection units 511 to 517 constituting the inspection apparatus 500 (refer to FIG. 3A) is along the axial direction of the rotary electric machine 10 (in FIG. 10A, the x direction).

The inspection apparatus 500 inserted into the air gap AG travels using the crawler 641 in the state of adhering to the stator 40 by magnetic force of the permanent magnet 642. Here, the inspection apparatus 500 travels in a state in which the crawler 641 and the stator 40 are in close contact with each other, in contrast with a state in which the permanent magnet 642 and the stator 40 are not in close contact with but separate from each other.

Although illustration is omitted in FIG. 10A, in the inspection apparatus 500, the guide plates 621 and the guide plates 661 (refer to FIG. 3A) are inserted into the groove formed along the axial direction in the stator 40. Thus, the inspection apparatus 500 travels along the axial direction with the guide plates 621 and the guide plates 661 (refer to FIG. 3A). An operator observes images picked up by the image-pickup device 611, the image-pickup device 631, the image-pickup device 645, and the image-pickup device 671 provided in the inspection apparatus 500, and the operator operates the inspection apparatus 500, thereby performing the movement of the inspection apparatus 500 (refer to FIG. 3A, FIG. 3B).

Then, the inspection on the rotary electric machine 10 is performed using the functions included in the inspection apparatus 500 (refer to FIG. 3A).

In this embodiment, by observing digital moving images obtained by picking up images of the inner peripheral surface of the stator 40 with the image-pickup device 645 in real time, a condition of the stator 40 is inspected. In addition to this, to inspect looseness of the stator wedge (illustrated is omitted) for fixing the stator coil 42 to the stator core 41 in the stator 40, the inspection in which the stator wedge is struck with the hammer 643 to detect the sound at the time of striking with the microphone 644 is performed.

Further, in this embodiment, by observing digital moving images obtained by picking up images of the outer peripheral surface of the rotor 20 with the image-pickup device 631 in real time, a condition of the rotor 20 is inspected. Here, the inspection in which an image of the ventilation hole extending in the radial direction in the rotor 20 is picked up and the ventilation hole is whether to be in a closed state is performed.

FIG. 10B is a view illustrating the state of the inspection apparatus 500 when the inspection is performed on the ventilation hole of the rotor 20 constituting the rotary electric machine 10 in the embodiment. FIG. 10B illustrates the vertical plane (yz plane) orthogonal to the axial direction (x direction) similarly to FIG. 10A.

As illustrated in FIG. 10B, when the inspection is performed on a ventilation hole V of the rotor 20 constituting the rotary electric machine 10, the inspection unit 513 constituting the rotor image-pickup unit in the inspection apparatus 500 is used. At this time, in the inspection unit 513, to make the image-pickup position of the camera 910 correspond to the ventilation hole V, the image-pickup position changing part 930 moves the image-pickup device 631 in the circumferential direction of the rotor 20 (the arrow AR1). Further, in the inspection unit 513, the image-pickup direction changing part 950 changes the image-pickup direction of the camera 910 (the arrow AR2). In this embodiment, this causes the image-pickup direction of the camera 910 to be along a depth direction of the ventilation hole V, which allows an image of the ventilation hole V to be picked up from directly thereabove.

[F] Summary

As described above, in the inspection apparatus 500 of this embodiment, the inspection unit 513 which is the rotor image-pickup unit includes the rotor image-pickup device 631 including the image-pickup position changing part 930 and the image-pickup direction changing part 950. The image-pickup position changing part 930 is configured to change the image-pickup position of the camera 910 by moving the carriage casing 900 in the circumferential direction of the rotor 20 in the air gap AG. The image-pickup direction changing part 950 is configured to change the image-pickup direction of the camera 910 to the inclined angle to the radial direction of the rotor 20 in the air gap AG. In this embodiment, this allows the image-pickup position changing part 930 to move the camera 910 to the ventilation hole V provided in the rotor 20, which makes it easy for the image-pickup direction of the camera 910 to fall into a state along the depth direction of the ventilation hole V, as described above. As a result, the image can be precisely picked up to a deep portion of the ventilation hole V, which enables easy determination of whether or not the ventilation hole V is closed. Accordingly, the inspection apparatus 500 of this embodiment easily enables an efficient inspection.

The inspection apparatus 500 of this embodiment includes the plurality of inspection units 511 to 517 and the coupling shaft 520. The plurality of inspection units 511 to 517 are provided for performing the inspection on the rotary electric machine 10 in the air gap AG between the rotor 20 and the stator 40. The coupling shaft 520 is provided for coupling the plurality of inspection units 511 to 517 therebetween. Here, the plurality of inspection units 511 to 517 are configured to be detachable between one another. Further, through each of the plurality of inspection units 511 to 517, the coupling holes H510 into which the coupling shafts 520 are inserted in their coupled state are formed. This allows any change in the length of the inspection apparatus 500 according to inspection contents as illustrated in FIG. 3A and FIG. 5 in this embodiment, and efficiently enables the work of inserting the inspection apparatus 500 into the air gap AG between the rotor 20 and the stator 40. Further, in this embodiment, when a failure occurs in a part of the plurality of inspection units 511 to 517 constituting the inspection apparatus 500, the failed inspection unit can be replaced.

In the inspection apparatus 500 of this embodiment, the inspection unit 513 includes the frame 630 housing the image-pickup device 631, in addition to the image-pickup device 631 which is the inspection device. In the frame 630, at least the surface is formed using resin. In this embodiment, also in each of the frames of the other inspection units 511, 512, 514 to 517, at least the surface is formed using the resin, similarly to the frame 630 of the inspection unit 513.

In this embodiment, this allows a reduction in weight of the inspection apparatus 500, which makes it possible to prevent damage such as a flaw to an inspection object from occurring even though the inspection apparatus 500 is in contact with the inspection object. Further, the number of assembly parts such as screws can be reduced, which allows a reduction of the risk due to a fall-off of the assembly parts such as screws.

In the inspection apparatus 500 of this embodiment, the frame 630 of the inspection unit 513 is in the arc shape along the shape of the air gap AG between the rotor 20 and the stator 40. In this embodiment, the frames of the other inspection units 511, 512, 514 to 517 are also each in the arc shape along the shape of the air gap AG similarly to the frame 630 of the inspection unit 513. In this embodiment, this allows easy insertion of the inspection apparatus 500 into the air gap AG in the cylindrical shape, and allows smooth movement of the inspection apparatus 500 in the air gap AG.

[G] Modified Example

A modified example of the above-described embodiment will be described.

Figure 11:
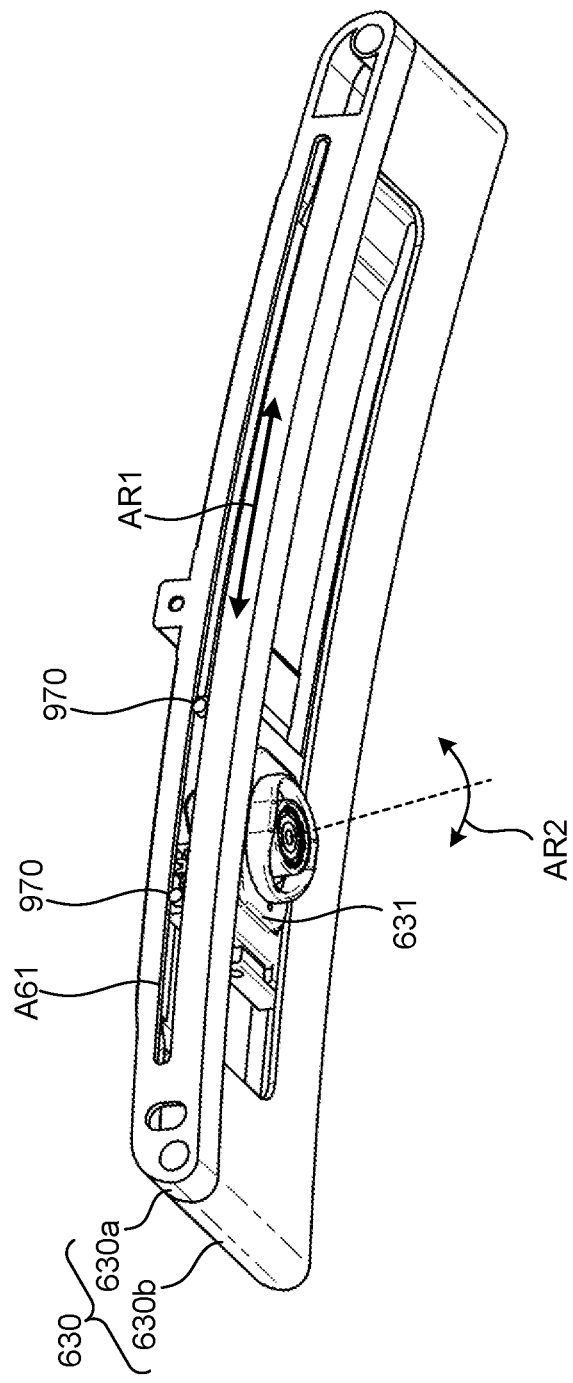
FIG. 11 is a perspective view illustrating the inspection unit 513 in a modified example of the embodiment.

FIG. 11 is a perspective view illustrating the inspection unit 513 in the modified example of the embodiment.

As illustrated in FIG. 11, in the inspection unit 513, a guide hole A61 is formed in the frame 630. The guide hole A61 is formed in the first frame member 630a of the frame 630 so as to extend along a direction in which the image-pickup device 631 moves.

Further, a pair of the pins 970 provided for the image-pickup device 631 is inserted inside the guide hole A61. When the image-pickup device 631 moves in the circumferential direction of the rotor 20 (the arrow AR1), a pair of the pins 970 swings inside the guide hole A61. In this modified example, this causes the image-pickup device 631 to move along the guide hole A61, which enables smooth movement of the image-pickup device 631.

Further, as a matter of course, the inspection apparatus 500 of the above-described embodiment may be configured to enable various kinds of inspection in addition to the above-described inspection. For example, the inspection apparatus 500 may be configured to further include an inspection unit for conducting an electromagnetic core imperfection detection (EL-CID) test on the stator 40.

OTHERS

While certain embodiments of the present invention have been described above, these embodiments have been presented by way of example only, and are not intended to limit the scope of the inventions. Indeed, these embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the invention.

REFERENCE SIGNS LIST

10: rotary electric machine, 20: rotor, 40: stator, 41: stator core, 42: stator coil, 60: rotary electric machine casing, 61: inner casing, 62: outer casing, 80: gas cooler, 90: fan, 200: rotor core, 201: rotary shaft, 500: inspection apparatus, 511: inspection unit, 511M: male fitting portion, 512: inspection unit, 512F: female fitting portion, 512M: male fitting portion, 513: inspection unit (rotor image-pickup unit), 513F: female fitting portion, 513M: male fitting portion, 514: inspection unit, 514F: female fitting portion, 515: inspection unit, 516: inspection unit, 517: inspection unit, 600: control apparatus, 611: image-pickup device, 612: lighting device, 621: guide plate, 630: frame, 630a: first frame member, 630b: second frame member, 631: image-pickup device (rotor image-pickup device), 632: flexible cable, 641: crawler, 642: permanent magnet, 643: hammer, 644: microphone, 645: image-pickup device, 661: guide plate, 671: image-pickup device, 700: cable, 800: inspection system, 801: rack gear, 900: carriage casing, 910: camera, 910a: image-pickup lens, 910b: lighting section, 911: camera holder, 911a: shaft pin, 912: spur gear, 913: bush, 914: bush, 930: image-pickup position changing part, 950: image-pickup direction changing part, AG: air gap, AX: rotation axis, CG: cooling gas, HS: hexagon socket set screw, H510: coupling hole, K61: through hole, K611: opening, K62: through hole, SC1: screw, SC2: screw, SP910: housing space, SP930: housing space, SP950: housing space

What is claimed is:

1. An inspection apparatus which, when an inspection is performed on a rotary electric machine in which an air gap is interposed between a rotor and a stator, and a ventilation hole along a radial direction of the rotor is formed in the rotor, is inserted into the air gap, and adheres to the stator, and travels along an axial direction of the rotor, the inspection apparatus comprising:

a rotor image-pickup unit for picking up an image of the rotor using a rotor image-pickup device in the air gap, wherein the rotor image-pickup device comprises:

a carriage casing;

a camera installed in the carriage casing, and configured to pick up an image of the ventilation hole of the rotor;

an image-pickup position changing part installed in the carriage casing, and configured to change an image-pickup position of the camera by moving the carriage casing in a circumferential direction of the rotor; and an image-pickup direction changing part installed in the carriage casing, and configured to change an image-pickup direction of the camera to an inclined angle to the radial direction of the rotor, with the axial direction serving as a support axis.

2. The inspection apparatus according to claim 1, wherein:

the rotor image-pickup unit includes a frame housing the rotor image-pickup device, wherein the frame includes a rack gear; and the image-pickup position changing part includes:

an image-pickup position changing motor; and an image-pickup position changing pinion gear installed on a rotation shaft of the image-pickup position changing motor, and configured to engage with the rack gear, wherein the rotor image-pickup device is configured to move inside the frame by the image-pickup position changing motor rotating the image-pickup position changing pinion gear.

3. The inspection apparatus according to claim 2, wherein the frame is in an arc shape along a shape of the air gap.

4. The inspection apparatus according to claim 1, wherein:
the rotor image-pickup device comprises
a camera holder installed in the carriage casing to swing at the inclined angle to the radial direction of the rotor, and housing the camera, wherein
the camera holder includes
a spur gear; and
the image-pickup direction changing part includes:
an image-pickup direction changing motor; and
an image-pickup direction changing pinion gear installed on a rotation shaft of the image-pickup direction changing motor, and configured to engage with the spur gear,
wherein an image-pickup direction of the camera is changed by the image-pickup direction changing motor rotating the image-pickup direction changing pinion gear.

5. An inspection system comprising:
the inspection apparatus according to claim 1; and
a control apparatus for controlling operation of the inspection apparatus based on an operation command.

6. An inspection apparatus which, when an inspection is performed on a rotary electric machine in which an air gap is interposed between a rotor and a stator, is inserted into the air gap, and travels along an axial direction of the rotor, the inspection apparatus comprising:
a plurality of inspection units for performing the inspection in the air gap; and
a coupling shaft for coupling the plurality of inspection units therebetween, wherein:
the plurality of inspection units are configured to be detachable between one another in the axial direction; and
through each of the plurality of inspection units, a coupling hole into which the coupling shaft is inserted in a coupled state is formed.

7. The inspection apparatus according to claim 6, wherein:
each of the plurality of inspection units includes:
a frame; and
an inspection device provided in the frame; and
in the frame, at least a surface is formed using resin.

8. The inspection apparatus according to claim 7, wherein the frame is in an arc shape along a shape of the air gap.

* * * * *